United States Patent
Kadowaki

(10) Patent No.: US 10,748,297 B2
(45) Date of Patent: Aug. 18, 2020

(54) DIMENSION MEASUREMENT DEVICE, PARCEL LOCKER SYSTEM, AND DIMENSION MEASUREMENT METHOD

(71) Applicant: Panasonic Intellectual Property Management Co., Ltd., Osaka (JP)

(72) Inventor: Nobuaki Kadowaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 16/062,714

(22) PCT Filed: Dec. 16, 2016

(86) PCT No.: PCT/JP2016/005154
§ 371 (c)(1),
(2) Date: Jun. 15, 2018

(87) PCT Pub. No.: WO2017/110071
PCT Pub. Date: Jun. 29, 2017

(65) Prior Publication Data
US 2018/0374232 A1    Dec. 27, 2018

(30) Foreign Application Priority Data

Dec. 25, 2015 (JP) .................. 2015-254673
Feb. 23, 2016 (JP) .................. 2016-032501
Feb. 23, 2016 (JP) .................. 2016-032502

(51) Int. Cl.
*G06T 7/62* (2017.01)
*B65G 1/137* (2006.01)
(Continued)

(52) U.S. Cl.
CPC .................. *G06T 7/62* (2017.01); *B65G 1/04* (2013.01); *B65G 1/137* (2013.01); *G01B 11/02* (2013.01);
(Continued)

(58) Field of Classification Search
CPC ........... G06K 9/4604; G06T 7/62; G06T 7/80; G06T 7/13; G06T 7/60; G06T 5/006;
(Continued)

(56) References Cited

U.S. PATENT DOCUMENTS 5,661,561 A * 8/1997 Wurz ..................... G01B 11/00
                                                     250/223 R
6,097,850 A    8/2000 Watanabe
(Continued)

FOREIGN PATENT DOCUMENTS

DE    10 2015 101 144 A1    8/2015
JP    H1-141307 A           6/1989
(Continued)

OTHER PUBLICATIONS

Extended European Search Report for corresponding App. No. 16877976.7, dated Nov. 15, 2018.
(Continued)

*Primary Examiner* — Ali Bayat
(74) *Attorney, Agent, or Firm* — Renner, Otto, Boisselle & Sklar, LLP

(57) ABSTRACT

A dimension measurement device includes: a storage receptacle; an imager configured to capture an image of a measurement object to be stored in the storage receptacle; and an image processor configured to process the image captured by the imager. The storage receptacle includes: a rectangular lower surface; a rectangular first side surface; a rectangular second side surface; a first concave corner formed by the lower surface and the first side surface; a second concave corner formed by the lower surface and the second side surface; a third concave corner formed by the first side surface and the second side surface; and a reference corner point formed at an intersection between the first concave corner, the second concave corner, and the third concave
(Continued)

corner. The storage receptacle further includes markers indicating locations of respective sides of the first side surface, the second side surface, and the lower surface.

6 Claims, 17 Drawing Sheets

(51) Int. Cl.

| | | |
|---|---|---|
| *G01B 11/02* | (2006.01) | |
| *G07F 17/12* | (2006.01) | |
| *G01B 21/04* | (2006.01) | |
| *G06T 7/80* | (2017.01) | |
| *G07G 1/00* | (2006.01) | |
| *G06T 5/00* | (2006.01) | |
| *G06T 7/60* | (2017.01) | |
| *G06T 7/13* | (2017.01) | |
| *B65G 1/04* | (2006.01) | |
| *H04N 5/225* | (2006.01) | |

(52) U.S. Cl.
CPC ............ *G01B 21/045* (2013.01); *G06T 5/003* (2013.01); *G06T 5/006* (2013.01); *G06T 7/13* (2017.01); *G06T 7/60* (2013.01); *G06T 7/80* (2017.01); *G07F 17/12* (2013.01); *G07G 1/0063* (2013.01); *H04N 5/2256* (2013.01); *G06T 2207/30112* (2013.01); *G06T 2207/30204* (2013.01)

(58) Field of Classification Search
CPC ........... G06T 5/003; G06T 2207/30112; G06T 2207/30204; G01B 11/02; G01B 21/045; G07G 1/0063
USPC ......................................................... 382/286
See application file for complete search history.

(56) References Cited

U.S. PATENT DOCUMENTS

| | | | | |
|---|---|---|---|---|
| 9,881,235 | B1* | 1/2018 | Narimanzadeh | G06K 9/624 |
| 2001/0002462 | A1* | 5/2001 | Kosuge | G01B 11/024 |
| | | | | 702/167 |
| 2005/0035980 | A1* | 2/2005 | Lonsing | G06T 15/00 |
| | | | | 345/633 |
| 2009/0002718 | A1* | 1/2009 | Wadman | A61B 5/0059 |
| | | | | 356/600 |
| 2012/0113250 | A1* | 5/2012 | Farlotti | G01B 11/00 |
| | | | | 348/135 |
| 2012/0140065 | A1 | 6/2012 | Farlotti | |
| 2014/0300722 | A1* | 10/2014 | Garcia | G01B 11/02 |
| | | | | 348/77 |
| 2015/0170378 | A1* | 6/2015 | Moran | G06K 9/4604 |
| | | | | 348/135 |

FOREIGN PATENT DOCUMENTS

| | | |
|---|---|---|
| JP | H10-214349 A | 8/1998 |
| JP | 2001-264018 A | 9/2001 |
| JP | 2002-250621 A | 9/2002 |
| JP | 2006-119792 A | 5/2006 |
| JP | 2007-192832 A | 8/2007 |
| JP | 2007-256116 A | 10/2007 |
| JP | 2009-222525 A | 10/2009 |
| JP | 2011-179980 A | 9/2011 |
| JP | 2012-168800 A | 9/2012 |
| JP | 2013-000851 A | 1/2013 |
| JP | 2014-35196 A | 2/2014 |
| JP | 2014-52270 A | 3/2014 |

OTHER PUBLICATIONS

International Search Report and Written Opinion for corresponding International Application PCT/JP2016/005154, dated Feb. 28, 2017.

* cited by examiner

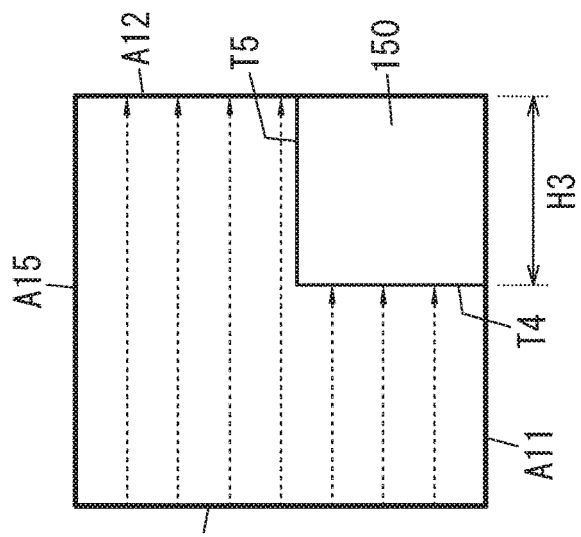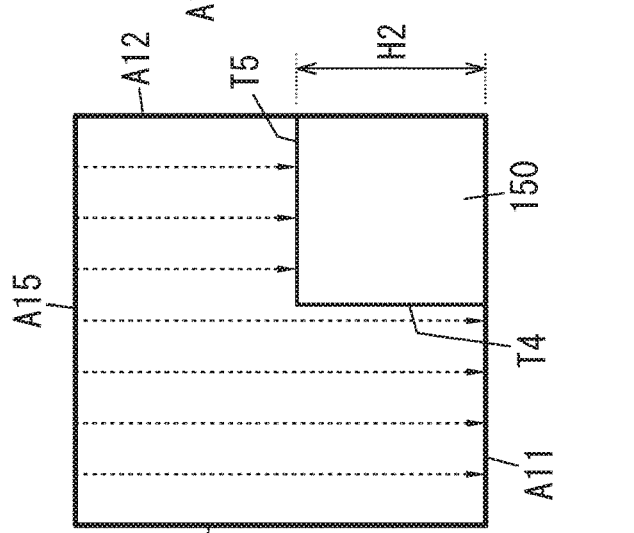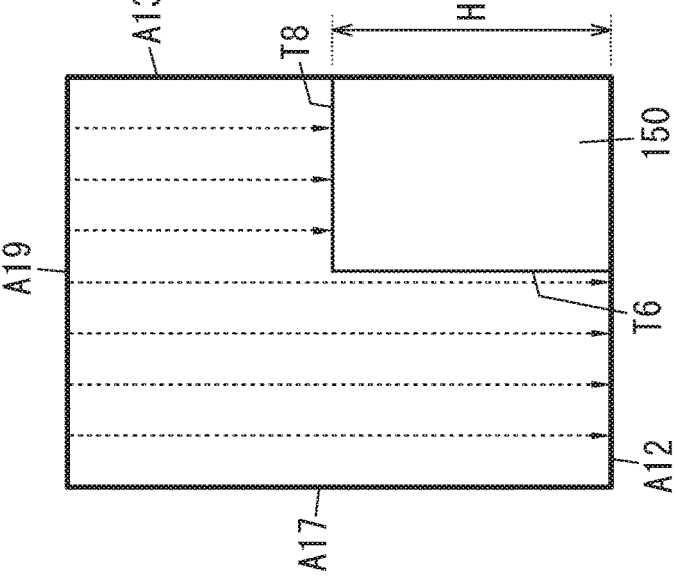

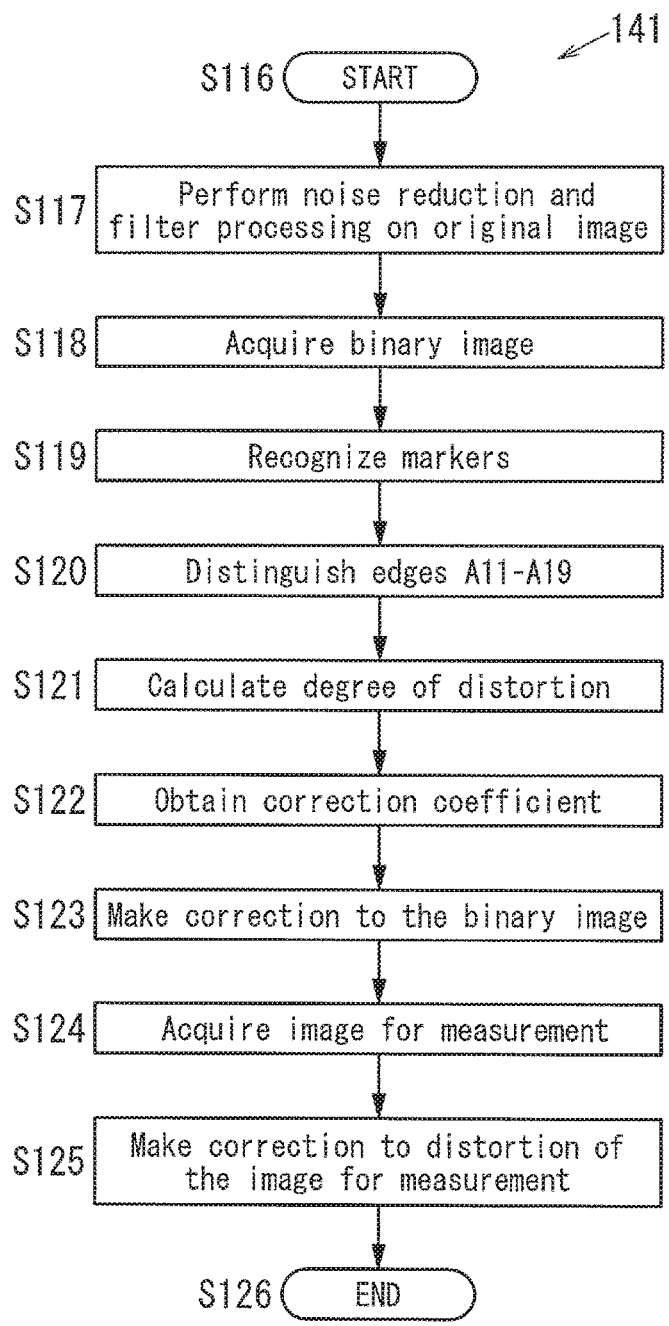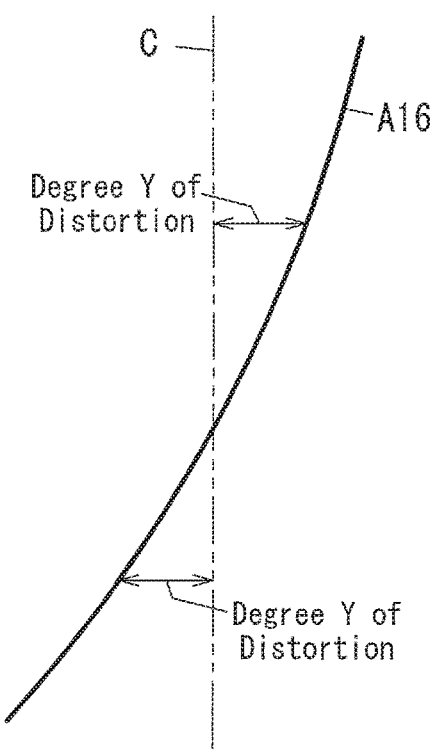

DIMENSION MEASUREMENT DEVICE, PARCEL LOCKER SYSTEM, AND DIMENSION MEASUREMENT METHOD

TECHNICAL FIELD

The present invention relates to a dimension measurement device, a parcel locker system including the dimension measurement device, and a dimension measurement method.

BACKGROUND ART

A known dimension measurement device includes a rectangular parallelepiped storage receptacle for storing a measurement object such as a parcel to drop off, an imager fixed at a vertex of the upper surface of the storage receptacle, and an image processor for performing image processing on an image, captured by the imager, of the measurement object (see, for example, Patent Literature 1).

However, any distortion in the image captured by imager would make it difficult for the dimension measurement device disclosed in Patent Literature 1 to accurately measure the size of the measurement object.

CITATION LIST

Patent Literature

Patent Literature 1: JP 2006-119792 A

SUMMARY OF INVENTION

It is therefore an object of the present invention to provide a dimension measurement device with the ability to accurately determine the size of a measurement object, a parcel locker system including such a dimension measurement device, and a dimension measurement method.

A dimension measurement device according to an aspect of the present invention may have the following configuration.

The dimension measurement device includes: a storage receptacle configured to store a measurement object so as to allow the measurement object to be readily loaded into, and unloaded from, the storage receptacle; and an imager provided for the storage receptacle to capture an image of the measurement object to be stored in the storage receptacle. The dimension measurement device further includes an image processor configured to perform image processing based on information about the image captured by the imager to measure a size of the measurement object.

The storage receptacle includes: a rectangular lower surface configured to put the measurement object thereon; a rectangular first side surface extended upward from the lower surface; and a rectangular second side surface also extended upward from the lower surface and adjacent to the first side surface. The storage receptacle further includes: a first concave corner formed by the lower surface and the first side surface; a second concave corner formed by the lower surface and the second side surface; and a third concave corner formed by the first side surface and the second side surface. The storage receptacle further includes a reference corner point formed at an intersection between the first concave corner, the second concave corner, and the third concave corner and defining a reference point for placing the measurement object at a predetermined location. The storage receptacle further includes markers provided for, and indicating locations of respective sides of, the first side surface, the second side surface, and the lower surface.

A parcel locker system according to another aspect of the present invention includes multiple different types of parcel storage boxes configured to store a given parcel, which is a measurement object that has had its size measured by the dimension measurement device, by classifying the parcel according to its size.

A dimension measurement method according to still another aspect of the present invention is executed by a dimension measurement device.

The dimension measurement device includes: a storage receptacle configured to store a measurement object so as to allow the measurement object to be readily loaded into, and unloaded from, the storage receptacle; and an imager provided for the storage receptacle to capture an image of the measurement object to be stored in the storage receptacle. The dimension measurement device further includes an image processor configured to perform image processing based on information about the image captured by the imager to measure a size of the measurement object.

The storage receptacle includes: a rectangular lower surface configured to put the measurement object thereon; a rectangular first side surface extended upward from the lower surface; and a rectangular second side surface also extended upward from the lower surface and adjacent to the first side surface. The storage receptacle further includes: a first concave corner formed by the lower surface and the first side surface; a second concave corner formed by the lower surface and the second side surface; and a third concave corner formed by the first side surface and the second side surface. The storage receptacle further includes a reference corner point formed at an intersection between the first concave corner, the second concave corner, and the third concave corner and defining a reference point for placing the measurement object at a predetermined location. The storage receptacle further includes markers provided for, and indicating locations of respective sides of, the first side surface, the second side surface, and the lower surface.

The image processor is configured to measure the size of the measurement object by performing: binarizing, before the measurement object is loaded into the storage receptacle, the image captured by the imager to generate a binary image; recognizing the markers in the binary image; distinguishing, by reference to the markers, respective edges corresponding to respective sides of the first side surface, the second side surface, and the lower surface in the binary image; generating, based on distortion of the respective edges, distortion correction data; binarizing, after the measurement object has been loaded into the storage receptacle, the image captured by the imager to generate a binary image; performing, in accordance with the distortion correction data, correction to edge distortion, detected in the binary image, of the measurement object to acquire a corrected image; and scanning planes, representing the first side surface, the second side surface, and the lower surface, of the corrected image.

BRIEF DESCRIPTION OF DRAWINGS

FIG. 8A is a side view of the first side surface in the binary image shown in FIG. 6B;

FIG. 8B is a plan view of the lower surface in the binary image shown in FIG. 6B;

FIG. 8C is a plan view of the lower surface in the binary image shown in FIG. 6B;

FIG. 9 is a flowchart showing the procedure of another exemplary correction mode of the dimension measurement method;

FIG. 10 illustrates how a virtual line C, generated by translating an edge A13, is superposed on an edge A16;

DESCRIPTION OF EMBODIMENTS

First Embodiment

A first embodiment relates to a dimension measurement device and a dimension measurement method.

A known dimension measurement device includes a rectangular parallelepiped storage receptacle for storing a measurement object such as a parcel, an imager fixed at a vertex of the upper surface of the storage receptacle, and an image processor for performing image processing on an image, captured by the imager, of the measurement object (see, for example, JP 2006-119792 A).

However, any distortion in the image captured by imager would make it difficult for the dimension measurement device and dimension measurement method disclosed in JP 2006-119792 A to accurately determine a size of the measurement object.

To overcome such a problem with the related art, an object of this first embodiment is to provide a dimension measurement device with the ability to accurately determine a size of the measurement object.

A dimension measurement device according to the first embodiment will now be described with reference to FIGS. 1-7 and FIGS. 8A-8C of the accompanying drawings.

The dimension measurement device 101 is configured to measure a size of the measurement object 150 such as a parcel to drop off. As used herein, the size of the measurement object 150 is determined by the length, width, and height dimensions of the measurement object 150. The measurement object 150 has either a cubic shape or a rectangular parallelepiped shape.

Figure 1:
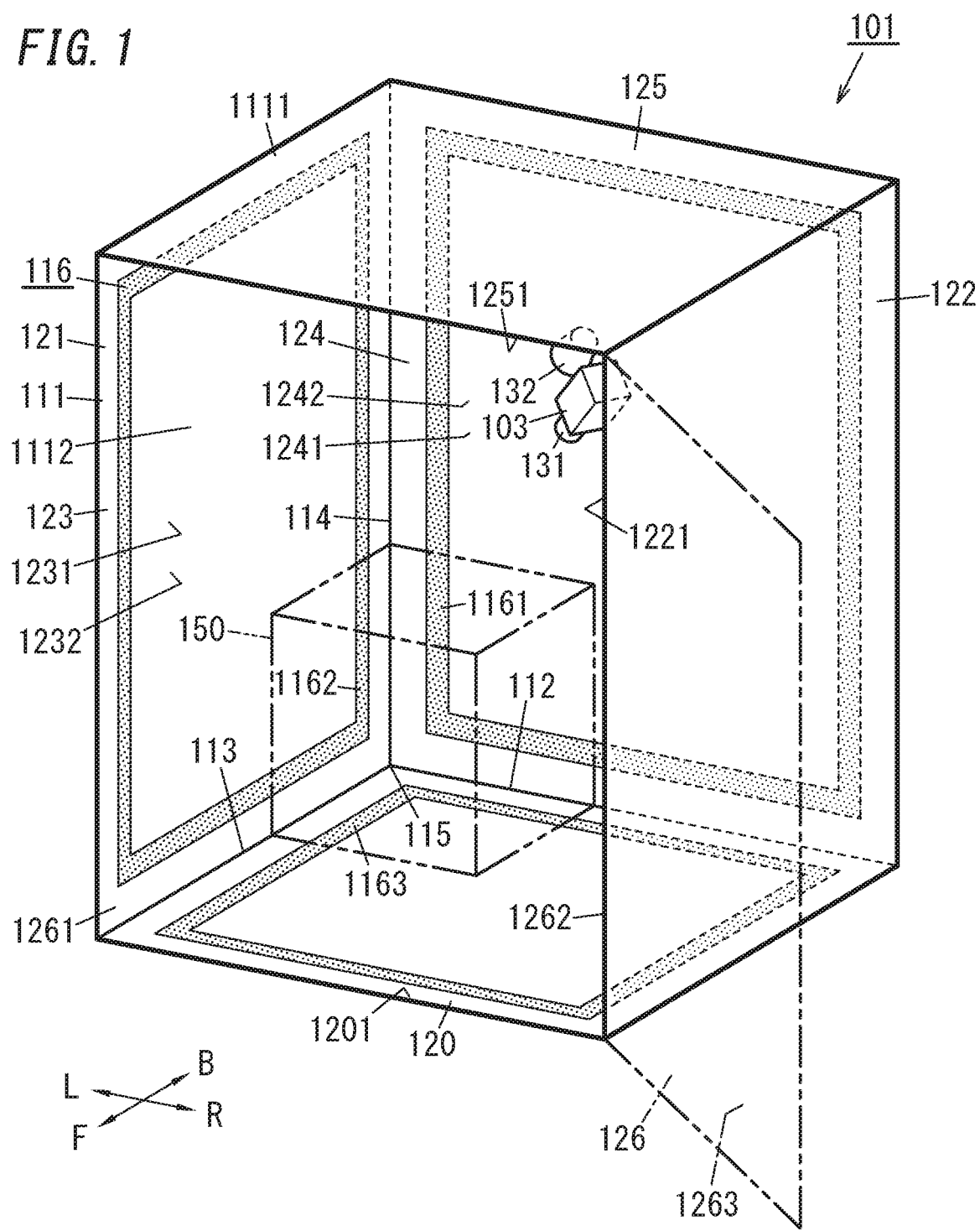
FIG. 1 is a perspective view illustrating a dimension measurement device according to a first embodiment.

The dimension measurement device 101 includes a storage receptacle 111 as shown in FIG. 1.

The storage receptacle 111 includes an outer shell 1111 defining the outer shape of this dimension measurement device 101 and an inner space 1112 created inside the outer shell 1111. The outer shell 1111 may have a rectangular parallelepiped shape. The outer shell 1111 includes a lower wall 120, sidewalls 121, and an upper wall 125. In this example, the sidewalls 121 of the outer shell 1111 have a receptacle opening 1261, through which the measurement object 150 is loaded into, and unloaded from, the inner space 1112.

In the dimension measurement device 101 according to the first embodiment, one side thereof with the receptacle opening 1261 will be hereinafter referred to as a "front F" end, while the opposite side thereof as a "back B" end. The right R and left L sides of the dimension measurement device 101 are defined with respect to a user standing in front to face the receptacle opening 1261 of the dimension measurement device 101. Following this nomenclature, the length dimension of the measurement object 150 herein refers to a dimension, measured in the longitudinal direction, of the measurement object 150. The width dimension of the measurement object 150 herein refers to a dimension, measured in the lateral direction, of the measurement object 150. The height dimension of the measurement object 150 herein refers to a dimension, measured in the vertical direction, of the measurement object 150.

The lower wall 120 has a rectangular shape when viewed from under the dimension measurement device 101. One surface, facing the inner space 1112 (i.e., the upper surface), of the lower wall 120 will be hereinafter referred to as a "lower surface" 1201. The measurement object 150 is put on the lower surface 1201.

The sidewalls 121 include a right wall 122, a left wall 123, and a rear wall 124. The right wall 122 is extended upward from the right end of the lower wall 120. The left wall 123 is extended upward from the left end of the lower wall 120. The rear wall 124 is extended upward from the rear end of the lower wall 120.

The right wall 122 has a rectangular shape when viewed from the right-hand side of the dimension measurement device 101. One surface, facing the inner space 1112 (i.e., the left surface), of the right wall 122 will be hereinafter referred to as a "right surface" 1221. The left wall 123 has a rectangular shape when viewed from the left-hand side of the dimension measurement device 101. One surface, facing the inner space 1112 (i.e., the right surface), of the left wall 123 will be hereinafter referred to as a "left surface" 1231. The rear wall 124 has a rectangular shape when viewed from behind the dimension measurement device 101. One surface, facing the inner space 1112 (i.e., the front surface), of the rear wall 124 will be hereinafter referred to as a "rear surface" 1241.

The upper wall 125 is connected to the respective upper ends of the right wall 122, left wall 123, and rear wall 124. The upper wall 125 has a rectangular shape when viewed from over the dimension measurement device 101. One surface, facing the inner space 1112 (i.e., the lower surface), of the upper wall 125 will be hereinafter referred to as an "upper surface" 1251.

The outer shell 1111 has the shape of a rectangular parallelepiped, of which the front (F) side is open. The opening on the front (F) side will be hereinafter referred to as a "receptacle opening" 1261. The outer shell 1111 has a door for covering and uncovering the receptacle opening 1261. The door is mounted onto the front end of the right wall 122 so as to turn around the front end of the right wall 122 as an axis 1262. The door closed has a rectangular shape when viewed from the front of the dimension measurement device 101. Also, when closed, the door forms the front wall 126 of the outer shell 1111. One surface, facing the inner space 1112 (i.e., the rear surface), of the door will be hereinafter referred to as a "front surface" 1263.

The inner space 1112 of the storage receptacle 111 is formed so as to be surrounded with the lower surface 1201, the right surface 1221, the left surface 1231, the rear surface 1241, the upper surface 1251, and the front surface 1263. The inner space 1112 is formed in a rectangular parallelepiped shape. In the following description, the rear surface 1241 will be hereinafter referred to as a "first side surface" 1242 and the left surface 1231 will be hereinafter referred to as a "second side surface" 1232.

The outer shell 1111 has a first concave corner 112 formed at an intersection between the lower surface 1201 and the first side surface 1242. The outer shell 1111 also has a second concave corner 113 formed at an intersection between the lower surface 1201 and the second side surface 1232. The outer shell 1111 further has a third concave corner 114 formed at an intersection between the first side surface 1242 and the second side surface 1232. In the outer shell 1111, an intersection between the first concave corner 112, the second concave corner 113, and the third concave corner 114 will be hereinafter referred to as a "reference corner point" 115.

In the storage receptacle 111, a reference point for placing the measurement object 150 at a predetermined location is set at the reference corner point 115.

In the storage receptacle 111, when placed with respect to the reference corner point 115, the measurement object 150 comes into contact with the lower surface 1201, the first side surface 1242, and the second side surface 1232, and thereby the length, width, and height positions of the measurement object 150 are determined. The location of the measurement object 150 that has been positioned in this manner defines the predetermined location of the measurement object 150.

As shown in FIG. 1, markers 116 are provided for inner surfaces of the storage receptacle 111. In this example, three markers 116 are provided for the first side surface 1242, the second side surface 1232, and the lower surface 1201, respectively. In the following description, the marker 116 provided for the first side surface 1242 will be hereinafter referred to as a "first marker" 1161, the marker 116 provided for the second side surface 1232 will be hereinafter referred to as a "second marker" 1162, and the marker 116 provided for the lower surface 1201 will be hereinafter referred to as a "third marker" 1163.

These markers 116 have a rectangular frame shape. Specifically, in the first side surface 1242, the first marker 1161 is defined by drawing a line along the third concave corner 114, drawing two lines parallel to the first concave corner 112 from the line's top and bottom, respectively, and then drawing a line connecting together the respective right ends of the two lines.

In the second side surface 1232, the second marker 1162 is defined by drawing a line along the third concave corner 114, drawing two lines parallel to the second concave corner 113 from the line's top and bottom, respectively, and then drawing a line connecting together the respective front ends of the two lines.

In the lower surface 1201, the third marker 1163 is defined by drawing a line along the first concave corner 112, drawing two lines parallel to the second concave corner 113 from the line's right and left ends, respectively, and then drawing a line connecting together the respective front ends of the two lines.

In this first embodiment, the first marker 1161, the second marker 1162, and the third marker 1163 all have the same color tone. It is recommended that their color tones be different from each other. As used herein, the "color tone" refers to a tone of a color such as the lightness and saturation thereof.

In the dimension measurement device 101, an imager 103 is installed in the storage receptacle 111 as shown in FIG. 1. The imager 103 is arranged at such a position as to capture an overview image of the inside of the storage receptacle 111. In the dimension measurement device 101 according to the first embodiment, the imager 103 is set up at a corner formed between the upper surface 1251, the right surface 1221, and the front surface 1263 so as to diagonally face the reference corner point 115.

The imager 103 includes a camera body 131 and a light fixture 132.

As the camera body 131, a camera with the ability to capture an overview image of the inside of the storage receptacle 111 may be used. Particularly, the camera body 131 is suitably a camera with the ability to capture respective images of the measurement object 150, the lower surface 1201, the first side surface 1242, and the second side surface 1232 in their entirety. A charge coupled device (CCD) camera may be used as the camera body 131. The camera body 131 suitably uses a wide angle lens to easily capture an overview image of the inside of the storage receptacle 111.

The light fixture 132 is electrically connected to a controller for the camera body 131. The light fixture 132 lights up the inside of the storage receptacle 111. In particular, the light fixture 132 is provided to allow the camera body 131 to capture sharp images of the measurement object 150, the first concave corner 112, the second concave corner 113, the third concave corner 114, the first marker 1161, the second marker 1162, and the third marker 1163. As the light fixture 132, a white light-emitting diode (LED) may be used, for example.

Figure 2:
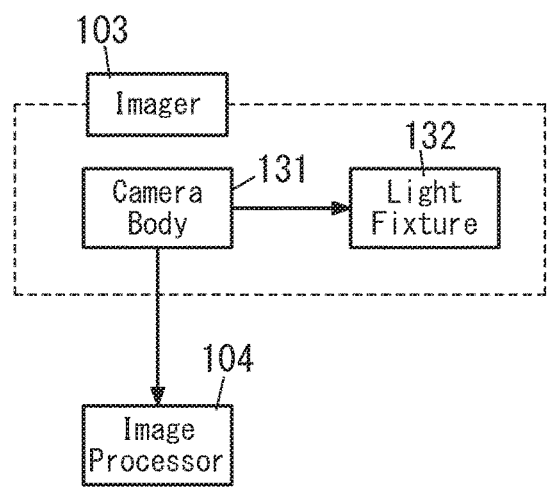
FIG. 2 is a block diagram illustrating an imager and an image processor which form part of the dimension measurement device.

The dimension measurement device 101 further includes an image processor 104 as shown in FIG. 2. The image processor 104 includes a microcomputer, which includes a central processing unit (CPU), a memory, and other components. The microcomputer performs control by making the CPU execute a program stored in the memory.

The image processor 104 performs image processing on the image captured by the imager 103. Also, the image processor 104 has a correction mode 141 including a program for making a correction to an image, stored in the memory, of the measurement object 150.

Figure 3:
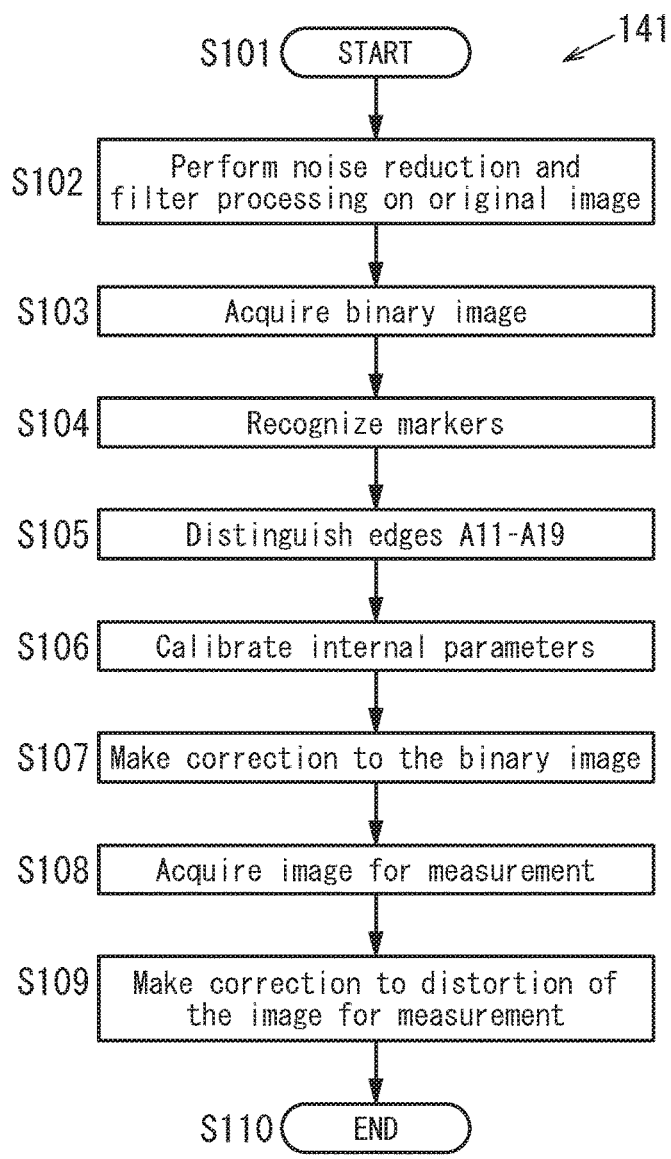
FIG. 3 is a flowchart showing the procedure of an exemplary correction mode of a dimension measurement method to be performed by the dimension measurement device.
Figure 4:
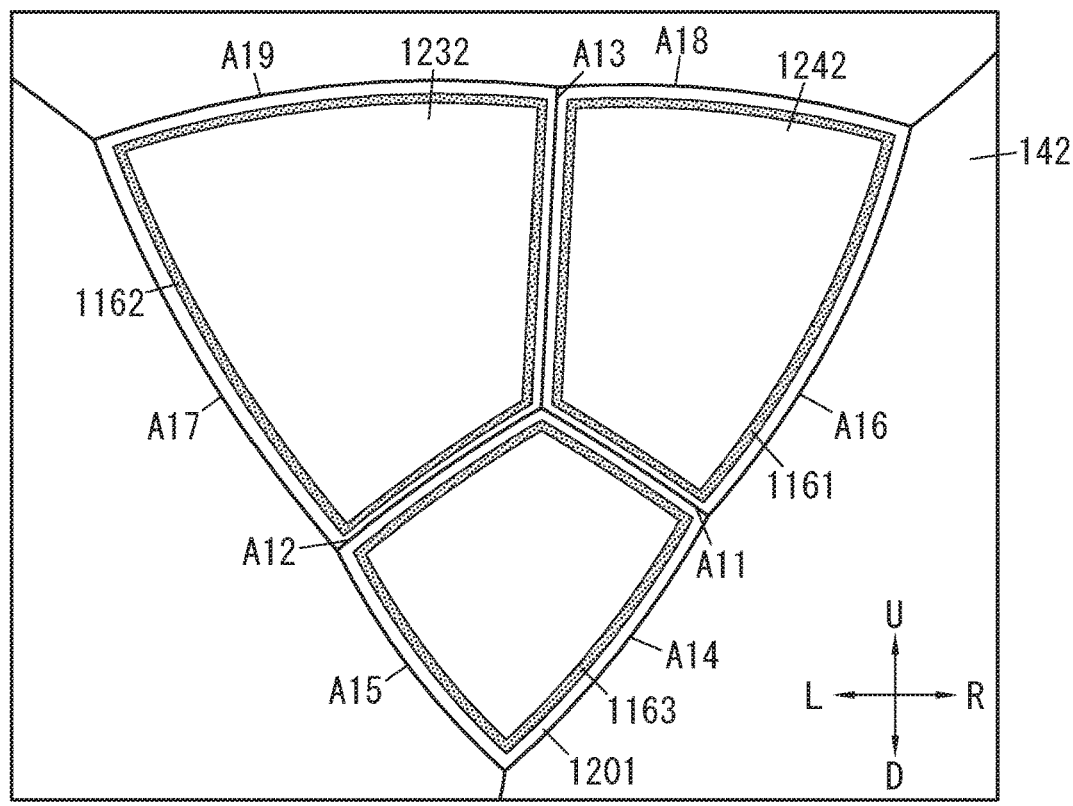
FIG. 4 illustrates a binary image captured and binarized by the imager.

The image processor 104 acquires an original image by making the imager 103 capture an image of the lower surface 1201, the first side surface 1242, the second side surface 1232, and the markers 116 in a state before the measurement object 150 is loaded into the storage receptacle 111. Based on this original image, the correction mode 141 shown in FIG. 3 is started in Step S101.

Step S102 of the correction mode 141 includes reducing noise from the original image (which is a grayscale image) and then performing filter processing on the image based on a luminance value, which forms part of information about the image that has had its noise reduced.

Step S103 of the correction mode 141 is detecting edges by binarizing the image that has been subjected to the filter processing. An image subjected to such processing will be hereinafter referred to as a "binary image" 142 (see FIG. 4). The binary image 142 is a two-dimensional image. Data about the binary image 142 is stored in the memory of the image processor 104.

Step S104 of the correction mode 141 is recognizing the markers 116 in the binary image 142 by pattern matching in accordance with information acquired in advance about the shape of the markers 116 and the luminance value.

Step S105 of the correction mode 141 is distinguishing respective sides of the first side surface 1242, the second side surface 1232, and the lower surface 1201 in the binary image 142 by reference to the first marker 1161, second marker 1162, and third marker 1163 that have been recognized. According to this correction mode 141, the edges A11-A19 are distinguished in the binary image 142.

Step S16 of the correction mode 141 is calibrating internal parameters, including the coordinates of the center of an optical axis, the focal length, and the lens distortion coefficient, for associating the coordinates of the binary image 142 before the distortion correction with those of the binary image 142 after the distortion correction. The internal parameters are calculated such that intersections are located in a checkerboard pattern of a captured image, of which the grid element size is already known, and have their intervals equalized with each other. Step S16 of the correction mode further includes applying the internal parameters obtained in advance to the storage receptacle 111 with the size already known, thus further optimizing the internal parameters with respect to the storage receptacle 111. In this case, the internal parameters are used as distortion correction data.

Figure 5:
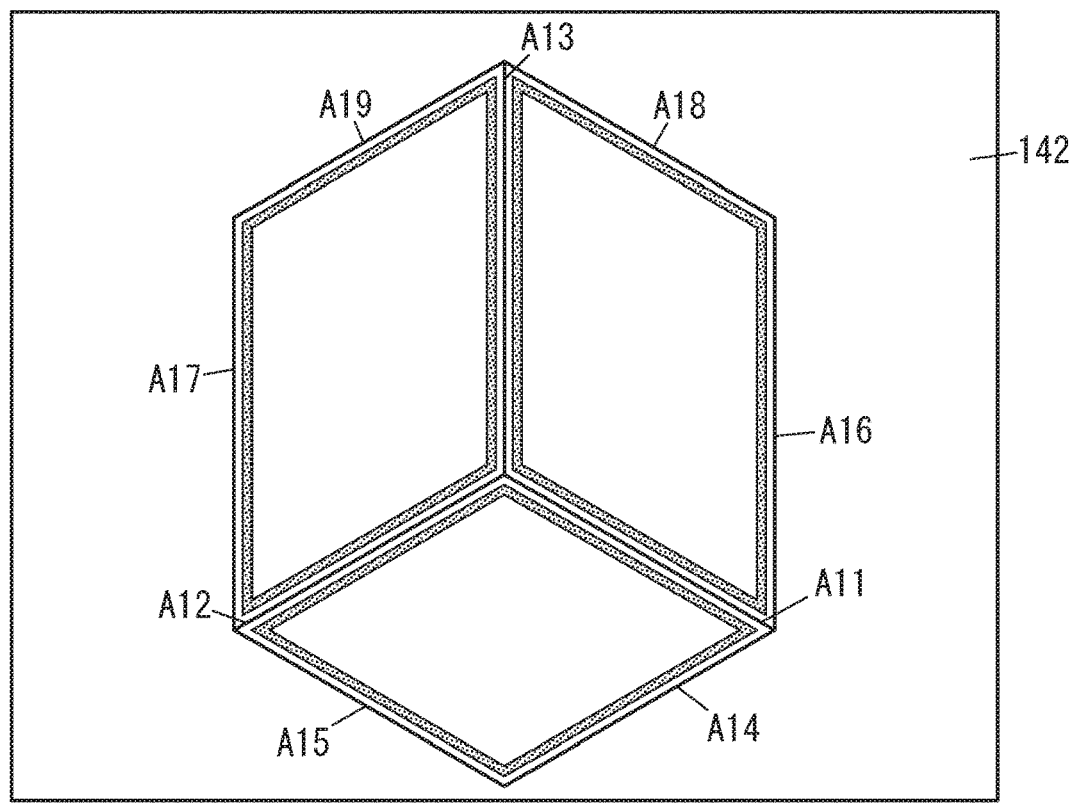
FIG. 5 illustrates a binary image corrected through the correction mode.

Step S107 of the correction mode 141 is performing, based on the internal parameters, correction to the distortion of the edges A11-A19 such that the edges A11-A19 are straightened, thereby acquiring the corrected binary image 142 shown in FIG. 5. According to the first embodiment, a known method that uses internal parameters (such as the one disclosed in JP 2015-35685 A) is used as a method of performing the correction mode 141. Alternatively, any other known method (such as the one disclosed in JP 2011-25428 A to be referred to later) may also be used.

Next, Step S18 of the correction mode 141 is acquiring an image for measurement by making the imager 103 capture an image of the lower surface 1201, the first side surface 1242, the second side surface 1232, the markers 116, and the measurement object 150 with the measurement object 150 placed at the predetermined location in the storage receptacle 111. The correction mode 141 further includes acquiring the binary image 142 shown in FIG. 6A by subjecting the image for measurement to noise reduction, filter processing, and binarization.

Figure 6A:
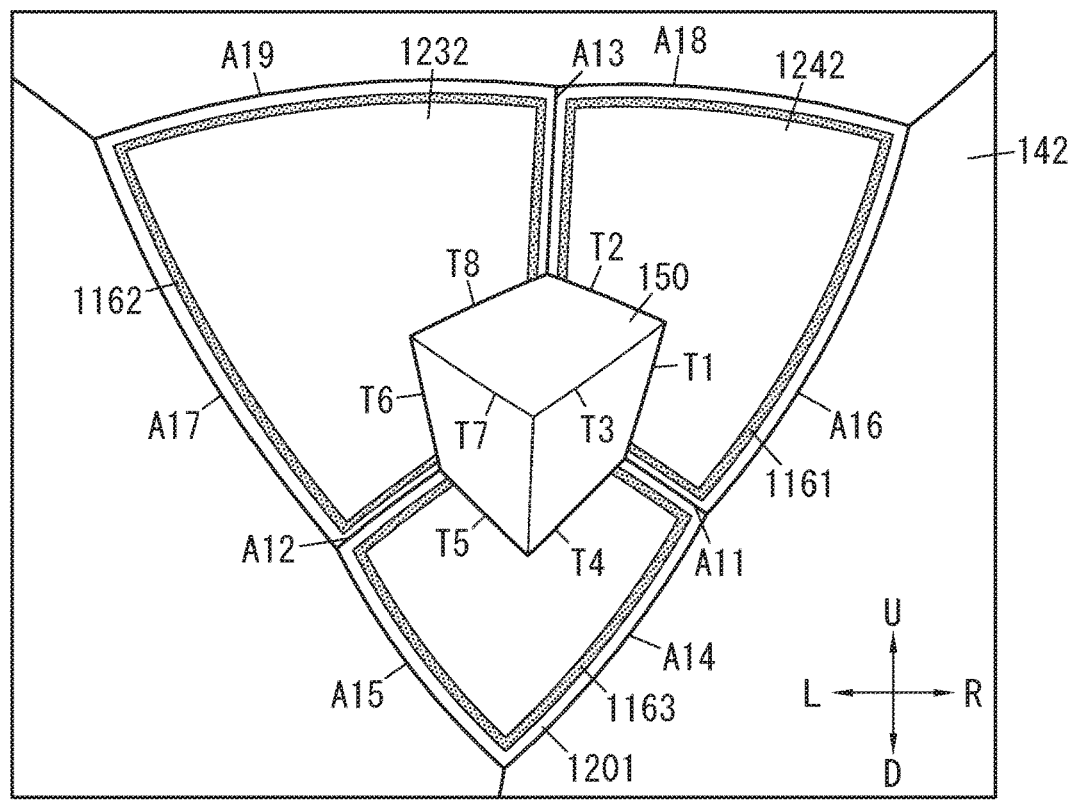
FIG. 6A illustrates an image for measurement representing a state where a measurement object is placed in a storage receptacle and captured by the imager.
Figure 6B:
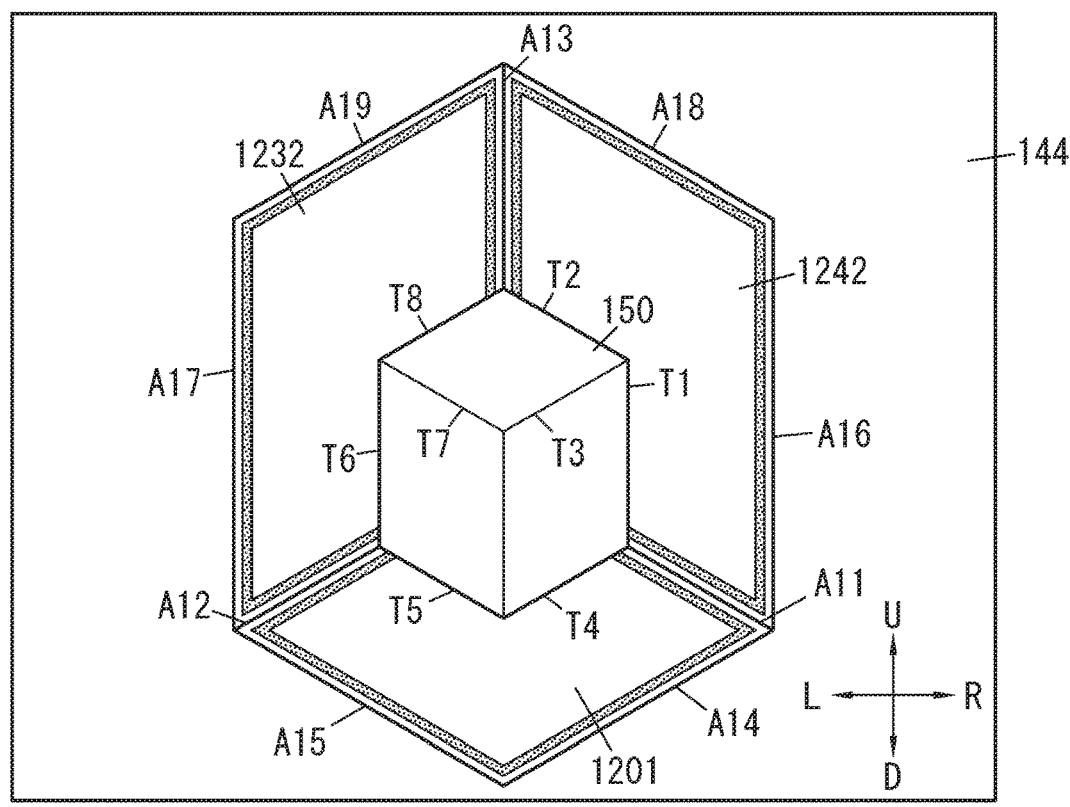
FIG. 6B illustrates a binary image representing the state where the measurement object is placed in the storage receptacle.

Step S19 of the correction mode 141 is making, using the internal parameters (distortion correction data), correction to the distortion of the edges A11-A19 and the edges T1-T8 of the measurement object 150 as shown in FIG. 6B.

In this manner, according to this correction mode 141, a corrected image 144 such as the one shown in FIG. 6B is acquired by making correction to the edges A11-A19 in the image for measurement and the edges T1-T8.

Figure 7:
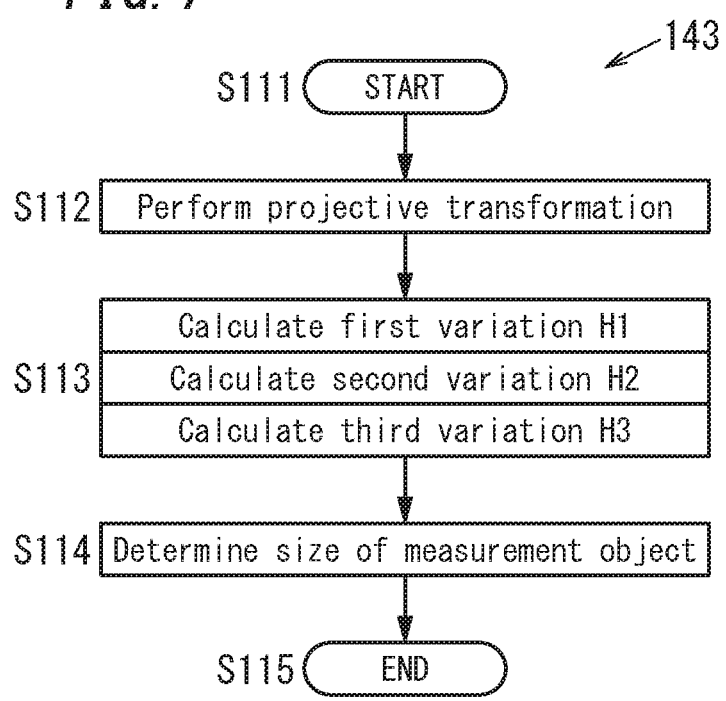
FIG. 7 is a flowchart showing the procedure of a size measurement mode of the dimension measurement method.

Next, the image processor 104 performs image processing on the binary image 142 that has been subjected to the correction through the correction mode 141, thereby performing a size measurement mode 143 for measuring a size of the measurement object 150 as shown in FIG. 7.

Step S108 of the size measurement mode 143 includes performing projective transformation using coordinates of the same order, thereby obtaining a side view (see FIG. 8A), as viewed obliquely from the right front, of the first side surface 1242 of the corrected binary image 142 with the measurement object 150 as shown in FIG. 6B. This size measurement mode 143 further includes acquiring a first plan view (see FIG. 8B), as viewed from over, of the lower surface 1201 of the corrected binary image 142 and a second plan view (see FIG. 8C), as viewed from over, of the lower surface 1201 of the corrected binary image 142.

Step S113 of the size measurement mode 143 includes scanning pixels which are arranged along the length of the edge A13 of the side view. In this step, a first variation H1 is calculated as the difference between the length based on the number of pixels from an edge A19 to an edge T8 and the length based on the number of pixels from the edge A19 to an edge A12 as shown in FIG. 8A.

The size measurement mode 143 further includes scanning pixels which are arranged along the length of the edge A12 of the first plan view. In this step, a second variation H2 is calculated as the difference between the length based on the number of pixels from an edge A15 to an edge T5 and the length based on the number of pixels from the edge A15 to an edge A11 as shown in FIG. 8B.

The size measurement mode 143 further includes scanning pixels which are arranged along the length of the edge A11 of the second plan view. In this step, a third variation H3 is calculated as the difference between the length based on the number of pixels from an edge A14 to an edge T4 and the length based on the number of pixels from the edge A14 to an edge A12 as shown in FIG. 8C.

Step S114, shown in FIG. 7, of the size measurement mode 143 includes determining the height of the measurement object 150 based on the first variation H1 and the ratio of the length based on the number of pixels of the edge A13 in the corrected binary image 142 shown in FIG. 6B to the actual length of the third concave corner 114. Likewise, Step S114 further includes determining the length dimension of the measurement object 150 based on the second variation H2 and determining the width dimension of the measurement object 150 based on the third variation H3.

Another example of the correction mode 141 is a distortion correction method such as the one shown in FIG. 9.

Steps S116-S120 of this correction mode 141 are the same as the above-described steps S101-S105, respectively, and description thereof will be omitted herein.

Step S121 of this correction mode 141 is comparing each of the edges A11-A19 with a straight line corresponding to the edge A11-A19 to calculate the degree Y of distortion of the edge A11-A19 with respect to the straight line. For example, the degree Y of distortion may be obtained by superposing a virtual line C, which is a straight line, over the edge A16 (see FIG. 10). Next, Step S122 of the correction mode 141 is obtaining, based on the degree Y of distortion, a correction coefficient K to straighten the edge A16. The correction mode 141 further includes obtaining their correction coefficient K by performing similar processing on each of the other edges.

Step S123 of the correction mode 141 is acquiring the corrected binary image 142 shown in FIG. 6B by making correction, with the respective correction coefficients K, to the distortion of the edges A11-A19 and straightening those edges A11-A19. In this case, the correction coefficients K are used as distortion correction data.

Note that among the edges detected by the image processor 104, the edges A11, A12, and A13 are straight lines and less likely to be distorted even when their image is captured by the imager 103 with a wide angle lens. Therefore, the degree Y of distortion may be obtained based on these edges A11-A13.

Next, Step S124 of the correction mode 141 is acquiring an image for measurement such as the one shown in FIG. 6A by making the imager 103 capture an image of the lower surface 1201, the first side surface 1242, the second side surface 1232, the markers 116, and the measurement object 150 with the measurement object 150 placed at the predetermined location in the storage receptacle 111.

Step S125 of the correction mode 141 is making, with the correction coefficients K (distortion correction data), correction to the distortion of the edges A11-A19 and the edges T1-T8 of the measurement object 150 as shown in FIG. 6B.

The correction is made to each of the edges A11-A19 with their associated correction coefficient K. The correction coefficient K for the edge T1 may be obtained, for example, on the supposition that there is a proportional relationship between the relative position of the edge T1 with respect to the edges A13 and A16 and the respective correction coefficients K for the edges A13 and A16. Likewise, as for each of the other edges T2-T8, the correction coefficient K for the edge may also be determined based on their relative position with respect to associated two of the edges A11-A19.

Note that this method for determining the correction coefficients for the edges T1-T8 is only an example and should not be construed as limiting.

The configuration of the dimension measurement device 101 according to the first embodiment described above is only a non-limiting exemplary aspect of the present invention. The dimension measurement device 101 may also be implemented in accordance with any of the following alternative aspects.

The correction mode 141 may include reducing, with a moving average filter or a median filter, noise from the image captured with the imager 103.

The filter processing of the correction mode 141 uses a Sobel filter or a Prewitt filter as a first-order differential operator, for example. Alternatively, a second-order differential operator may also be used for the filter processing.

Furthermore, in the correction mode 141, the image subjected to the filter processing may be binarized by the moving average method or by a method using two threshold values, for example.

The markers 116 do not have to be dots or rectangular ones but may also have any other polygonal shape.

The measurement object 150 does not have to be a cubic or rectangular parallelepiped one, but three surfaces thereof to be imaged by the imager 103 just need to have a generally rectangular shape.

The outer shell 1111 is supposed to be a rectangular parallelepiped one in the embodiment described above but may also have a cubic or any other appropriate shape. Alternatively, the outer shell 1111 may also have a locally raised shape.

The inner space 1112 is supposed to be a rectangular parallelepiped one in the embodiment described above but may also have a cubic or any other appropriate shape.

The reference corner point 115 may be defined by any one of the four corners formed by the lower surface 1201, the right surface 1221, the left surface 1231, the rear surface 1241, and the front surface 1263.

The camera body 131 may also be a complementary metal oxide semiconductor (CMOS) camera.

The image captured by the imager 103 may be a grayscale image or a color image. If the image captured by the imager 103 is a color image, the color image is suitably converted into a grayscale image during the image processing.

In the imager 103, the light fixture 132 is connected to the controller for the camera body 131 so as to be turned ON and OFF by the controller for the camera body 131. Alternatively, the light fixture 132 may be connected to, and controlled by, the image processor 104.

Optionally, in the imager 103, the controller for the camera body 131 and the light fixture 132 may be connected together wirelessly.

Also, in the imager 103, the camera body 131 and the light fixture 132 may be provided separately from each other.

The light fixture 132 may also be a fluorescent lamp, a light bulb, or an LED in any other appropriate color. The light fixture 132 suitably has such color and brightness that would allow the image processor 104 to easily detect edges in the image captured by the camera body 131.

The CPU of the image processor 104 may be any appropriate one of various known microcomputers.

The dimension measurement device 101 described above is able to easily distinguish, with the markers 116, the edges A11-A19 corresponding to respective sides of the lower surface 1201, the first side surface 1242, and the second side surface 1232 in the binary image 142. This facilitates the processing for making correction to the distortion of the edges A11-A19 and the edges T1-T8 in the binary image 142, thus enabling the size of the measurement object 150 more quickly.

In addition, changing the color tone for the first marker 1161, the second marker 1162, and the third marker 1163 makes it even easier to distinguish the edges A11-A19 corresponding to respective sides of the lower surface 1201, the first side surface 1242, and the second side surface 1232.

As can be seen from the foregoing description, the dimension measurement device 101 according to the first embodiment has the following configuration.

The dimension measurement device 101 according to the first embodiment has the following first feature. The dimension measurement device 101 with the first feature includes: a storage receptacle 111 configured to store a measurement object 150 so as to allow the measurement object 150 to be readily loaded into, and unloaded from, the storage receptacle 111; and an imager 103 provided for the storage receptacle 111 to capture an image of the measurement object 150 to be stored in the storage receptacle 111. The dimension measurement device 101 further includes an image processor 104 configured to perform image processing based on information about the image captured by the imager 103 to measure a size of the measurement object 150.

The storage receptacle 111 includes: a rectangular lower surface 1201 configured to put the measurement object 150 thereon; a rectangular first side surface 1242 extended upward from the lower surface 1201; and a rectangular second side surface 1232 also extended upward from the lower surface 1201 and adjacent to the first side surface 1242. The storage receptacle 111 further includes: a first concave corner 112 formed by the lower surface 1201 and the first side surface 1242; a second concave corner 113 formed by the lower surface 1201 and the second side surface 1232; and a third concave corner 114 formed by the first side surface 1242 and the second side surface 1232. The storage receptacle 111 further includes a reference corner point 115 formed at an intersection between the first concave corner 112, the second concave corner 113, and the third concave corner 114 and defining a reference point for placing the measurement object 150 at a predetermined location. The storage receptacle 111 further includes markers 116 indicating locations of respective sides of the first side surface 1242, the second side surface 1232, and the lower surface 1201.

The dimension measurement device 101 with the first feature is able to easily make correction to distortion in the binary image 142 by reference to the markers 116.

The dimension measurement device 101 with the first feature has the following second additional feature. According to the second feature, the markers 116 are each implemented as a line, a dot, or a polygon.

The dimension measurement device 101 with the second feature is able to form the markers 116 easily.

The dimension measurement device 101 with the first or second feature has the following third additional feature. According to the third feature, the markers 116, provided for multiple different surfaces, have mutually different color tones.

The dimension measurement device 101 with the third feature is able to easily distinguish edges A11-A19 corresponding to respective sides of the first side surface 1242, the second side surface 1232, and the lower surface 1201 in the binary image 142.

The dimension measurement device 101 with one of the first to third features has the following fourth additional feature. According to the fourth feature, the storage receptacle 111 further includes: a rectangular upper surface 1251 extended from respective upper ends of the first side surface 1242 and the second side surface 1232; and a receptacle opening 1261 facing the first side surface 1242 and allowing the measurement object 150 to be readily loaded into, and unloaded from, the storage receptacle 111.

The imager 103 is arranged at an end of the upper surface 1251. The end is located adjacent to a side of the receptacle opening 1261 and opposite from the reference corner point 115.

The dimension measurement device 101 with the fourth feature allows the imager 103 to more easily capture an overview image of the lower surface 1201, the first side surface 1242, the second side surface 1232, the measurement object 150, and the markers 116.

The dimension measurement device 101 with one of the first to fourth features has the following fifth additional feature. According to the fifth feature, the imager 103 includes a light fixture 132 configured to light up the storage receptacle 111.

The dimension measurement device 101 with this fifth feature is able to overcome a lack of light inside the storage receptacle 111 by illuminating the inside of the storage receptacle 111 with light emitted from the light fixture 132.

The dimension measurement device 101 with one of the first to fifth features has the following sixth additional feature. According to the sixth feature, the measurement object 150 is placed at a deep corner of the lower surface 1201 of the storage receptacle 111.

The dimension measurement device 101 with this sixth feature allows the imager 103 to more easily capture an overview image of the measurement object 150.

A dimension measurement method according to the first embodiment is designed as follows.

The dimension measurement method according to the first embodiment has the following sixth feature. According to the sixth feature, the dimension measurement method is executed by a dimension measurement device 101 including a storage receptacle 111, an imager 103, and an image processor 104. The storage receptacle 111 is configured to store a measurement object 150 so as to allow the measurement object 150 to be readily loaded into, and unloaded from, the storage receptacle 111. The imager 103 is provided for the storage receptacle 111 to capture an image of the measurement object 150 to be stored in the storage receptacle 111. The image processor 104 is configured to perform image processing based on information about the image captured by the imager 103 to measure a size of the measurement object 150.

The storage receptacle 111 includes: a rectangular lower surface 1201 configured to put the measurement object 150 thereon; a rectangular first side surface 1242 extended upward from the lower surface 1201; and a rectangular second side surface 1232 also extended upward from the lower surface 1201 and adjacent to the first side surface 1242. The storage receptacle 111 further includes: a first concave corner 112 formed by the lower surface 1201 and the first side surface 1242; a second concave corner 113 formed by the lower surface 1201 and the second side surface 1232; and a third concave corner 114 formed by the first side surface 1242 and the second side surface 1232. The storage receptacle 111 further includes a reference corner point 115 formed at an intersection between the first concave corner 112, the second concave corner 113, and the third concave corner 114 and defining a reference point for placing the measurement object 150 at a predetermined location. The storage receptacle 111 further includes markers 116 indicating locations of respective sides of the first side surface 1242, the second side surface 1232, and the lower surface 1201.

The image processor 104 binarizes, before the measurement object 150 is loaded into the storage receptacle 111, the image captured by the imager 103 to generate a binary image 142. The image processor 104 recognizes the markers 116 in the binary image 142, and also distinguishes, by reference to the markers 116, respective edges A11-A19 corresponding to respective sides of the first side surface 1242, the second side surface 1232, and the lower surface 1201 in the binary image 142, thereby generating, based on distortion of the respective edges A11-A19, distortion correction data. The image processor 104 binarizes, after the measurement object 150 has been loaded into the storage receptacle 111, the image captured by the imager 103 to generate a binary image 142. The image processor 104 performs, in accordance with the distortion correction data, correction to the distortion of edges T1-T8, detected in the binary image 142, of the measurement object 150 to acquire a corrected image 144. Then, the image processor 104 scans planes, representing the first side surface 1242, the second side surface 1232, and the lower surface 1201, of the corrected image 144, thereby measuring a size of the measurement object 150.

The dimension measurement method with the sixth feature is able to easily make correction to distortion in the binary image 142 by reference to the markers 116.

The dimension measurement method with the sixth feature has the following seventh additional feature. According to the seventh feature, the storage receptacle 111 further includes: a rectangular upper surface 1251 extended from respective upper ends of the first side surface 1242 and the second side surface 1232; and a receptacle opening 1261 facing the first side surface 1242 and allowing the measurement object 150 to be loaded into, and unloaded from, the storage receptacle 111.

The imager 103 is arranged at an end of the upper surface 1251. The end is located adjacent to a side of the receptacle opening 1261 and opposite from the reference corner point 115.

The dimension measurement method with the seventh feature allows the imager 103 to more easily capture an overview image of the lower surface 1201, the first side surface 1242, the second side surface 1232, the measurement object 150, and the markers 116.

The markers 116 provided for the dimension measurement device 101 according to the first embodiment described above may also be like the ones shown in FIGS. 11A-11C (which will be hereinafter referred to as "alternative examples"). Those alternative examples of the dimension measurement device 101 relate to alternative shapes for the markers 116, in particular.

Figure 11A:
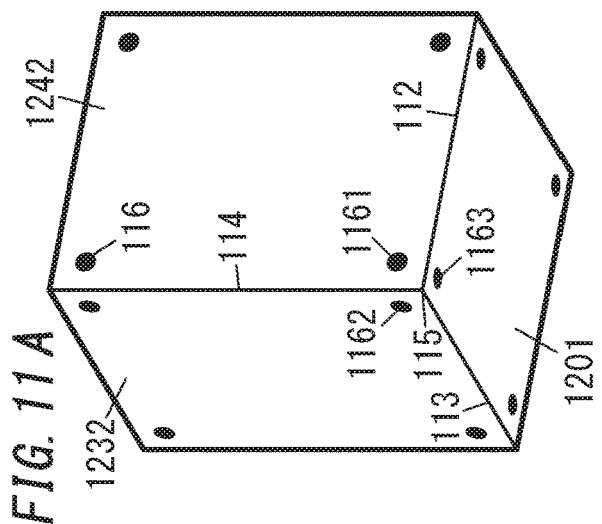
FIG. 11A is a perspective view illustrating another exemplary set of markers for the dimension measurement device.

On the inner surfaces of the storage receptacle 111, a plurality of markers 116 may be provided as shown in FIG. 11A. In this case, the markers 116 are dots. A plurality of first markers 1161 may be provided for the first side surface 1242 at four corners of the first side surface 1242, for example. Second markers 1162 may be provided at four corners of the second side surface 1232. Third markers 1163 may be provided at four corners of the lower surface 1201.

Figure 11B:
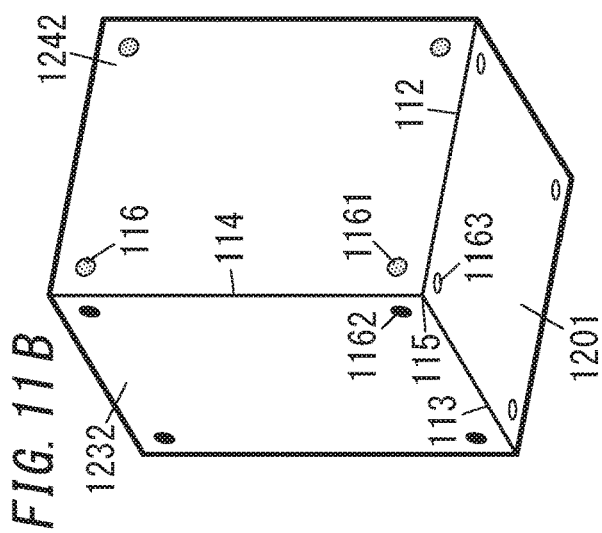
FIG. 11B is a perspective view illustrating still another exemplary set of markers for the dimension measurement device.

Alternatively, on the inner surfaces of the storage receptacle 111, a plurality of markers 116 may also be provided as shown in FIG. 11B. In this case, the markers 116 are also dots. However, unlike the example illustrated in FIG. 11A, the set of third markers 1163 provided at the four corners of the lower surface 1201 are open dots with no color.

Figure 11C:
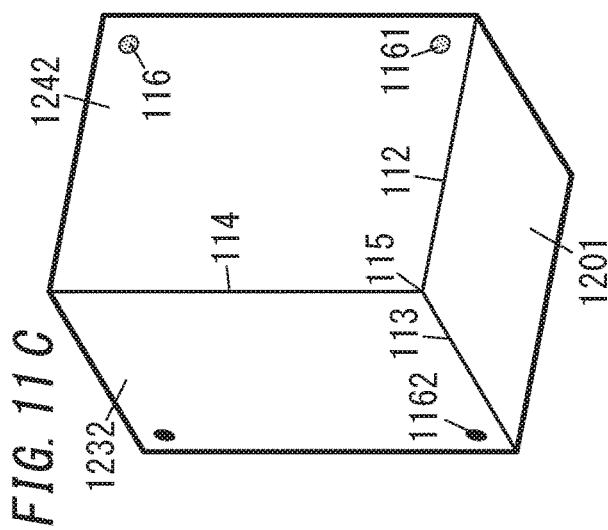
FIG. 11C is a perspective view illustrating yet another exemplary set of markers for the dimension measurement device.

Still alternatively, on the inner surfaces of the storage receptacle 111, a plurality of markers 116 may be provided as shown in FIG. 11C. In this case, the markers 116 are also dots. First markers 1161 are respectively provided at both ends of one side, opposite from the third concave corner 114, of the first side surface 1242. Second markers 1162 are respectively provided at both ends of one side, opposite from the third concave corner 114, of the second side surface 1232. No third markers 1163 are provided for the lower surface 1201.

Figure 11D:
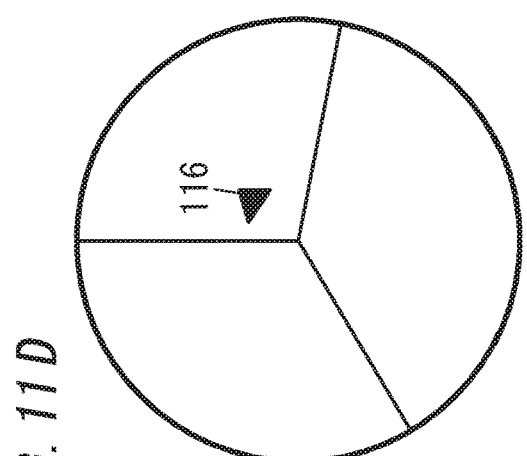

Yet alternatively, the markers 116 may also be polygonal ones such as the triangular marker shown in FIG. 11D.

Figure 11E:
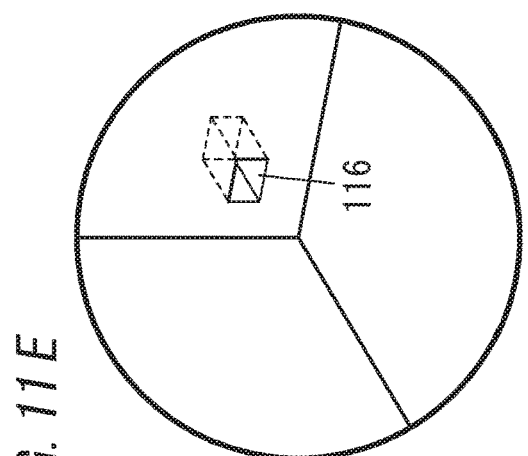

Yet alternatively, the markers 116 may even be recesses formed in an inner surface of the storage receptacle 111 as shown in FIG. 11E.

Figure 11F:
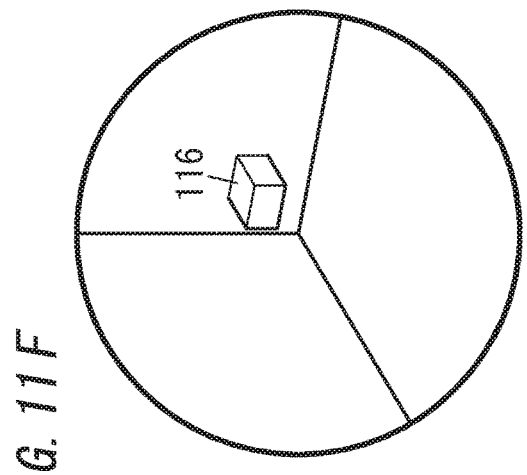

Yet alternatively, the markers 116 may even be projections formed on an inner surface of the storage receptacle 111 as shown in FIG. 11F.

Second Embodiment

A second embodiment of the present invention to be described below particularly relates to a dimension measurement device for measuring a size of a measurement object based on an image captured by an imager and a parcel locker system including the dimension measurement device.

A dimension measurement device 1 according to the second embodiment will be described with reference to FIGS. 12-15 and FIGS. 16A-16C of the accompanying drawings.

The dimension measurement device 1 measures a size of the measurement object 80. As used herein, a size of a measurement object 80 is determined by the length, width, and height dimensions of the measurement object 80. The measurement object 80 has either a cubic shape or a rectangular parallelepiped shape.

Figure 12:
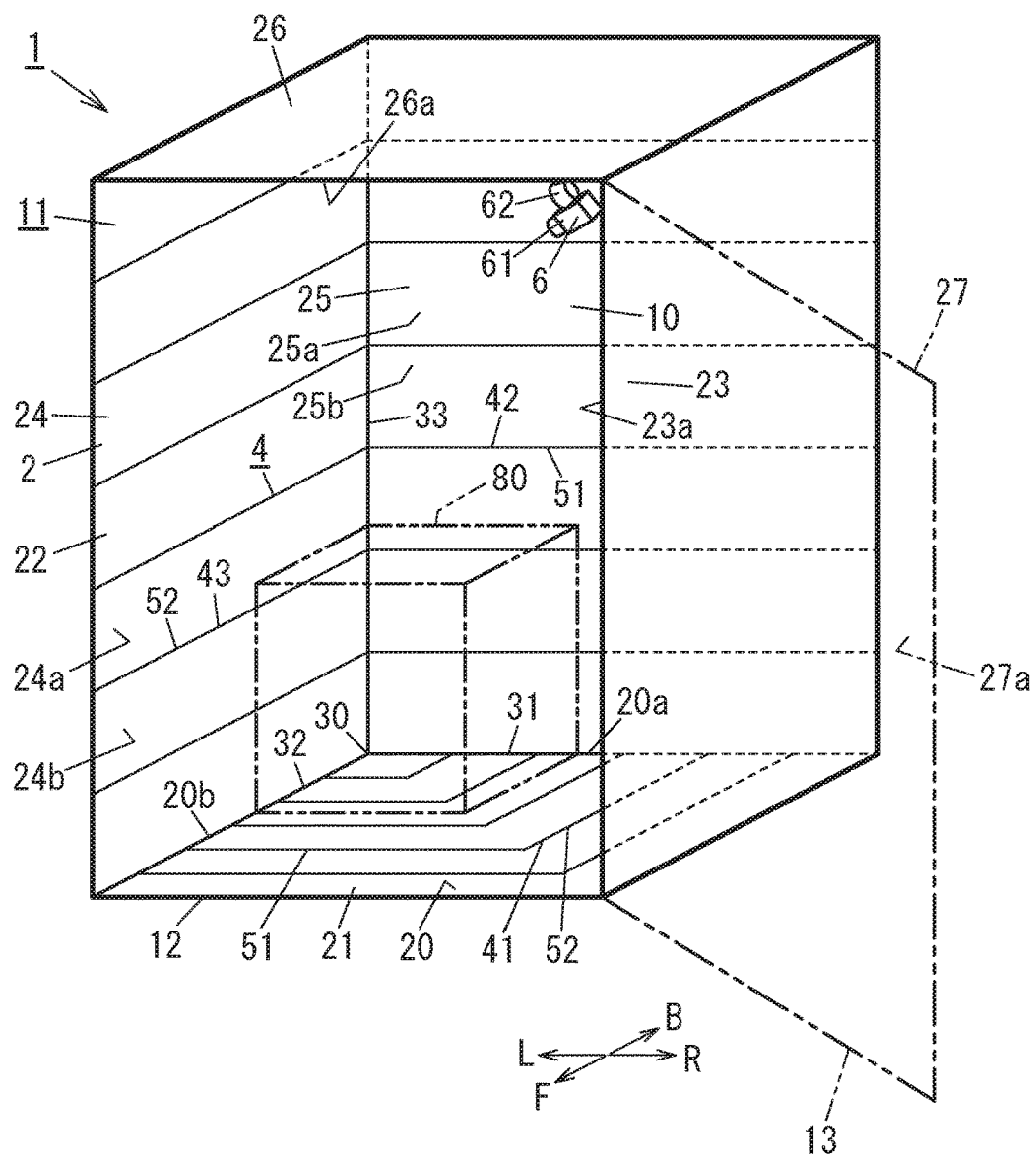
FIG. 12 is a perspective view illustrating a dimension measurement device according to a second embodiment of the present invention.

The dimension measurement device 1 includes a storage receptacle 111 as shown in FIG. 12.

The storage receptacle 11 includes an outer shell 2 defining the outer shape of this dimension measurement device 1 and an inner space 10 created inside the outer shell 2. The outer shell 2 may have a rectangular parallelepiped shape. The outer shell 2 includes a lower wall 21, sidewalls 22, and an upper wall 26. In this example, the sidewalls 22 of the outer shell 2 have a receptacle opening 12, implemented as an opening through which the measurement object 80 is loaded into, and unloaded from, the inner space 10.

In the dimension measurement device 1 according to the second embodiment, one side thereof with the receptacle opening 12 will be hereinafter referred to as a "front F" end, while the opposite side thereof as a "back B" end. The right R and left L sides of the dimension measurement device 1 are defined with respect to a user standing in front to face the receptacle opening 12 of the dimension measurement device 1. Following this nomenclature, the length dimension of the measurement object 80 herein refers to a dimension, measured in the longitudinal direction, of the measurement object 80. The width dimension of the measurement object 80 herein refers to a dimension, measured in the lateral direction, of the measurement object 80. The height dimension of the measurement object 80 herein refers to a dimension, measured in the vertical direction, of the measurement object 80.

The lower wall 21 has a rectangular shape when viewed from under the dimension measurement device 1. One surface, facing the inner space 10 (i.e., the upper surface), of the lower wall 21 will be hereinafter referred to as a "lower surface" 20. The measurement object 80 is put on the lower surface 20.

The sidewalls 22 include a right wall 23, a left wall 24, and a rear wall 25. The right wall 23 is extended upward from the right end of the lower wall 21. The left wall 24 is extended upward from the left end of the lower wall 21. The rear wall 25 is extended upward from the rear end of the lower wall 21.

The right wall 23 has a rectangular shape when viewed from the right-hand side of the dimension measurement device 1. One surface, facing the inner space 10 (i.e., the left surface), of the right wall 23 will be hereinafter referred to as a "right surface" 23*a*. The left wall 24 has a rectangular shape when viewed from the left-hand side of the dimension measurement device 1. One surface, facing the inner space 10 (i.e., the right surface), of the left wall 24 will be hereinafter referred to as a "left surface" 24*b*. The rear wall 25 has a rectangular shape when viewed from behind the dimension measurement device 1. One surface, facing the inner space 10 (i.e., the front surface), of the rear wall 25 will be hereinafter referred to as a "rear surface" 25*b*.

The upper wall 26 is connected to the respective upper ends of the right wall 23, left wall 24, and rear wall 25. The upper wall 26 has a rectangular shape when viewed from over the dimension measurement device 1. One surface, facing the inner space 10 (i.e., the lower surface), of the upper wall 26 will be hereinafter referred to as an "upper surface" 26*a*.

The outer shell 2 has the shape of a rectangular parallelepiped, of which the front side is open. The opening on the front side will be hereinafter referred to as a "receptacle opening" 12. The outer shell 2 has a door 13 for covering and uncovering the receptacle opening 12. The door 13 is mounted onto the front end of the right wall 23 so as to turn around the front end of the right wall 23 as an axis. The door 13 closed has a rectangular shape when viewed from the front of the dimension measurement device 1. Also, when closed, the door 13 forms the front wall 27 of the outer shell 2. One surface, facing the inner space 10 (i.e., the rear surface), of the door 13 will be hereinafter referred to as a "front surface" 27*a*.

The inner space 10 of the storage receptacle 11 is formed so as to be surrounded with the lower surface 20, the right surface 23*a*, the left surface 24*b*, the rear surface 25*b*, the upper surface 26*a*, and the front surface 27*a*. The inner space 10 is formed in a rectangular parallelepiped shape.

In the storage receptacle 11, a reference point is set as a reference for placing the measurement object 80 at a predetermined location. The reference point according to the second embodiment is a deep left corner formed by the lower surface 20, the rear surface 25*b*, and the left surface 24*b* as shown in FIG. 12. In this case, one side, provided with the rear surface 25*b*, of the lower surface 20 will be hereinafter referred to as a "first side" 20*a*, while another side thereof provided with the left surface 24*b* will be hereinafter referred to as a "second side" 20*b*. The first side 20*a* and the second side 20*b* are linear and intersect with each other at right angles.

In the following description, the rear surface 25*b* will be hereinafter referred to as a "first side surface" 25*a* and the left surface 24*b* will be hereinafter referred to as a "second side surface" 24*a*.

The outer shell 2 has a first concave corner 31 formed at an intersection between the lower surface 20 and the first side surface 25*a*. The outer shell 2 also has a second concave corner 32 formed at an intersection between the lower surface 20 and the second side surface 24*a*. The outer shell 2 further has a third concave corner 33 formed at an intersection between the first side surface 25*a* and the second side surface 24*a*. In the outer shell 2, an intersection between the first concave corner 31, the second concave corner 32, and the third concave corner 33 will be hereinafter referred to as a "reference corner point" 30.

In the storage receptacle 11, when placed with respect to the reference corner point 30, the measurement object 80 comes into contact with the lower surface 20, the first side surface 25*a*, and the second side surface 24*a*, and thereby the length, width, and height positions of the measurement object 80 are determined. The location of the measurement object 80 thus positioned defines the predetermined location of the measurement object 80.

In the storage receptacle 11 according to the second embodiment, reference lines 4 are drawn as a reference for measuring a size of the measurement object 80 that has been placed at a predetermined location. The reference lines 4 may be straight lines such as first lines 51 extending parallel to the length of the first concave corner 31, second lines 52 extending parallel to the length of the second concave corner 32, and third lines 3 (see FIG. 19B) extending parallel to the length of the third concave corner 33. These reference lines 4 serve as markers indicating the locations of respective sides of the first side surface 25*a*, the second side surface 24*a*, and the lower surface 20.

The first lines 51 are drawn on either or each of the lower surface 20 and the first side surface 25*a*.

When drawn on the lower surface 20, the first lines 51 are extended rightward from the second concave corner 32. The first lines 51 are arranged forward from the first concave corner 31 at regular intervals. The first lines 51 may have a different color from the lower surface 20. In particular, the color of the first lines 51 suitably has a significantly different luminance value from that of the lower surface 20.

When drawn on the first side surface 25*a*, the first lines 51 are extended rightward from the third concave corner 33. The first lines 51 are arranged upward from the first concave corner 31 at regular intervals. The first lines 51 may have a different color from the first side surface 25*a*. In particular, the color of the first lines 51 suitably has a significantly different luminance value from the surface color of the first side surface 25*a*.

The second lines 52 are drawn on either or each of the lower surface 20 and the second side surface 24*a*.

When drawn on the lower surface 20, the second lines 52 are extended forward from the first concave corner 31. The second lines 52 are arranged rightward from the second concave corner 32 at regular intervals. The second lines 52 may have a different color from the lower surface 20. In particular, the color of the second lines 52 suitably has a significantly different luminance value from that of the lower surface 20.

When drawn on the second side surface 24*a*, the second lines 52 are extended forward from the third concave corner 33. The second lines 52 are arranged upward from the second concave corner 32 at regular intervals. The second lines 52 may have a different color from the second side surface 24*a*. In particular, the color of the second lines 52 suitably has a significantly different luminance value from the surface color of the second side surface 24*a*.

The third lines 53 are drawn on either or each of the first side surface 25*a* and the second side surface 24*a*.

When drawn on the first side surface 25*a*, the third lines 53 are extended upward from the first concave corner 31. The third lines 53 are arranged rightward from the third concave corner 33 at regular intervals. The third lines 53 may have a different color from the first side surface 25*a*. In particular, the color of the third lines 53 suitably has a significantly different luminance value from that of the first side surface 25*a*.

When drawn on the second side surface 24*a*, the third lines 53 are extended upward from the second concave corner 32. The third lines 53 are arranged forward from the third concave corner 33 at regular intervals. The third lines 53 may have a different color from the third side surface. In particular, the color of the third lines 53 suitably has a significantly different luminance value from that of the second side surface 24*a*.

The reference lines 4 are suitably solid lines.

In this dimension measurement device 1, reference lines 4 (hereinafter referred to as "first reference lines" 41) are drawn on the lower surface 20 as shown in FIG. 12. When viewed from over, the first reference lines 41 each have an L shape. The first reference lines 41 are each a combination of an associated one of the first lines 51 and an associated one of the second lines 52. In each of the first reference lines 41, the first line 51 and the second line 52 intersect with each other at right angles.

A plurality of first reference lines 41 are drawn on the lower surface 20. In the dimension measurement device 1 according to the second embodiment, five first reference lines 41 are drawn on the lower surface 20. Those first reference lines 41 are arranged at regular intervals.

According to the second embodiment, the first lines 51 of the first reference lines 41 are arranged forward from the reference corner point 30 at regular intervals. For example, the first lines 51 of the plurality of first reference lines 41 may be arranged at intervals of 5 cm. The following Table 1 shows the ordinal numbers of the first lines 51 of the first reference lines 41 as counted from the reference corner point 30 and the respective distances of their locations from the first concave corner 31:

TABLE 1

| Ordinal number of first line 51 as counted from reference corner point 30 | Distance from first concave corner 31 |
|---|---|
| $1^{st}$ | 5 cm |
| $2^{nd}$ | 10 cm |
| $3^{rd}$ | 15 cm |
| $4^{th}$ | 20 cm |
| $5^{th}$ | 25 cm |

According to the second embodiment, the second lines 52 of the first reference lines 41 are arranged rightward from the reference corner point 30 at regular intervals. For example, the second lines 52 of the plurality of first reference lines 41 may be arranged at intervals of 5 cm. The following Table 2 shows the ordinal numbers of the second lines 52 of the first reference lines 41 as counted from the reference corner point 30 and the respective distances of their locations from the second concave corner 32:

TABLE 2

| Ordinal number of second line 52 as counted from reference corner point 30 | Distance from second concave corner 32 |
|---|---|
| $1^{st}$ | 5 cm |
| $2^{nd}$ | 10 cm |
| $3^{rd}$ | 15 cm |
| $4^{th}$ | 20 cm |
| $5^{th}$ | 25 cm |

In this dimension measurement device 1, reference lines 4 (hereinafter referred to as "second reference lines" 42) are drawn on the first side surface 25*a*. The second reference lines 42 are the first lines 51. A plurality of second reference lines 42 are drawn on the first side surface 25*a*. In the dimension measurement device 1 according to the second embodiment, six second reference lines 42 are drawn on the first side surface 25*a*. Those second reference lines 42 are arranged at regular intervals.

According to the second embodiment, the second reference lines 42 are arranged upward from the reference corner point 30 at regular intervals. For example, the second reference lines 42 may be arranged at intervals of 5 cm. The following Table 3 shows the ordinal numbers of the second reference lines 42 as counted from the reference corner point 30 and the respective distances of their locations from the first concave corner 31:

TABLE 3

| Ordinal number of second reference line 42 as counted from reference corner point 30 | Distance from first concave corner 31 |
|---|---|
| $1^{st}$ | 5 cm |
| $2^{nd}$ | 10 cm |
| $3^{rd}$ | 15 cm |
| $4^{th}$ | 20 cm |
| $5^{th}$ | 25 cm |
| $6^{th}$ | 30 cm |

In this dimension measurement device 1, reference lines 4 (hereinafter referred to as "third reference lines" 43) are drawn on the second side surface 24*a*. The third reference lines 43 are the second lines 52. A plurality of third reference lines 43 are drawn on the second side surface 24*a*. In the dimension measurement device 1 according to the second embodiment, six third reference lines 43 are drawn on the second side surface 24*a*. Those third reference lines 43 are arranged at regular intervals.

According to the second embodiment, the third reference lines 43 are arranged upward from the reference corner point 30 at regular intervals. For example, the third reference lines 43 may be arranged at intervals of 5 cm. The following Table 4 shows the ordinal numbers of the third reference lines 43 as counted from the reference corner point 30 and the respective distances of their locations from the second concave corner 32:

TABLE 4

| Ordinal number of third reference line 43 as counted from reference corner point 30 | Distance from second concave corner 32 |
|---|---|
| $1^{st}$ | 5 cm |
| $2^{nd}$ | 10 cm |
| $3^{rd}$ | 15 cm |
| $4^{th}$ | 20 cm |
| $5^{th}$ | 25 cm |
| $6^{th}$ | 30 cm |

As can be seen, the storage receptacle 11 according to the second embodiment uses the first lines 51 and the second lines 52 among the first lines 51, the second lines 52, and the third lines 53.

In the dimension measurement device 1, an imager 6 is installed in the storage receptacle 11 as shown in FIG. 12. The imager 6 is arranged at such a position as to capture an overview image of the inside of the storage receptacle 11. In the dimension measurement device 1 according to the second embodiment, the imager 6 is set up at a corner formed between the upper surface 26*a*, the right surface 23*a*, and the front surface 27*a*.

Figure 13:
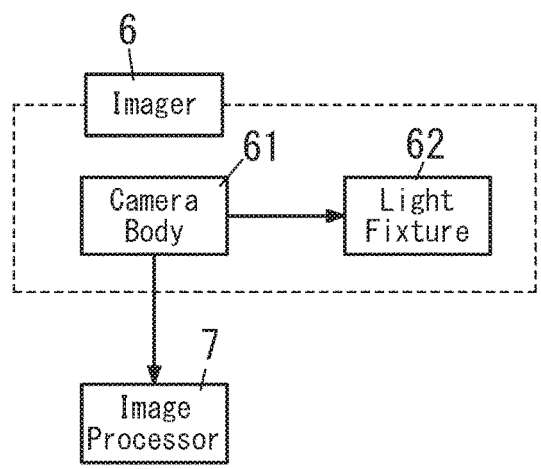
FIG. 13 is a block diagram illustrating an imager and an image processor thereof.

The imager 6 includes a camera body 61 and a light fixture 62 as shown in FIGS. 12 and 13.

As the camera body 61, a camera with the ability to capture an overview image of the inside of the storage receptacle 11 may be used. Particularly, the camera body 61 is suitably a camera with the ability to capture respective overview images of the measurement object 80, the lower surface 20, the first side surface 25*a*, and the second side surface 24*a*. A charge-coupled device (CCD) camera may be used as the camera body 61. The camera body 61 suitably includes a wide angle lens to easily capture an overview image of the inside of the storage receptacle 11.

The light fixture 62 is electrically connected to a controller for the camera body 61. The light fixture 62 lights up the inside of the storage receptacle 11. In particular, the light fixture 62 is provided to allow the camera body 61 to capture sharp images of the measurement object 80, the first concave corner 31, the second concave corner 32, the third concave corner 33, the first lines 51, the second lines 52, and the third lines 53. For the light fixture 62, a white light-emitting diode (LED) may be used, for example.

The dimension measurement device 1 further includes an image processor 7 as shown in FIG. 13. The image processor 7 includes a microcomputer, which includes a central processing unit (CPU), a memory, and other components. The microcomputer performs control by making the CPU execute a program stored in the memory.

The image processor 7 performs image processing on the image captured by the imager 6. Also, the image processor 7 has a size measurement mode 71 including a program, stored in the memory, for determining the size of the measurement object 80.

Figure 14:
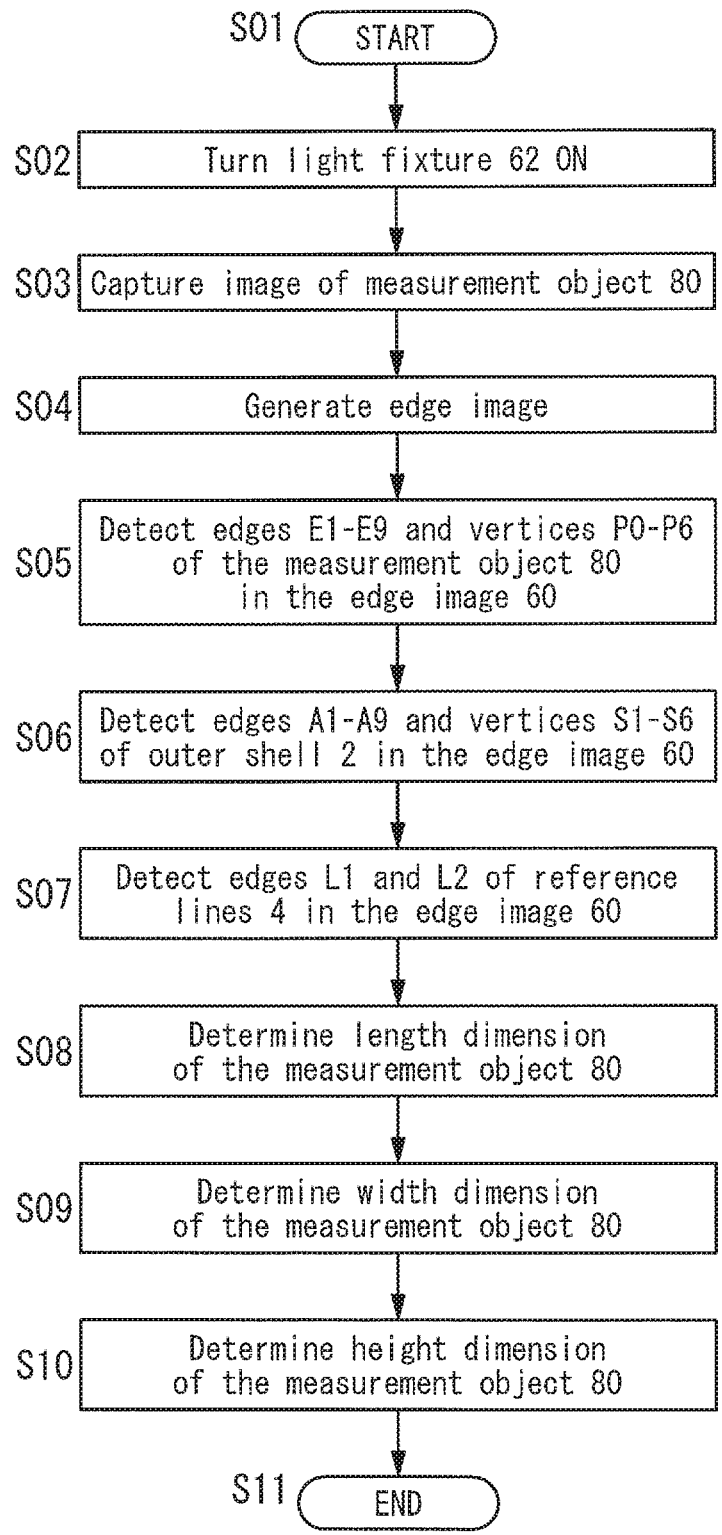
FIG. 14 is a flowchart illustrating the procedure of a size measurement mode for measuring a size of the measurement object.

The size measurement mode 71 includes determining the length, width, and height dimensions of the measurement object 80 following the procedure of the flowchart shown in FIG. 14, for example. The size measurement mode 71 includes detecting edges and vertices in the image captured by the imager 6 and determining the length, width, and height dimensions of the measurement object 80 based on the edges and vertices detected.

The processing of measuring a size of the measurement object 80 by loading the measurement object 80 into the dimension measurement device 1 shown in FIG. 12 will be described. In this case, in the dimension measurement device 1, the respective sets of data shown in Tables 1, 2, 3, and 4 are written in advance by the designer in the memory of the image processor 7.

The size measurement mode 71 is started in Step S01. The next Step S02 is turning the light fixture 62 ON and adjusting the brightness in the storage receptacle 11. The next Step S03 is acquiring an image of the inner surfaces of the storage receptacle 11 and the measurement object 80 by making the imager 6 capture an image of the inside of the storage receptacle 11.

The next Step S04 includes reducing noise from the image thus captured (as a grayscale image) and then performing filter processing based on the luminance value, which is a piece of information about the noise-reduced image, thereby detecting edges.

Step S04 further includes binarizing the image subjected to the filter processing, thus sharpening the edges. An image subjected to such processing will be hereinafter referred to as an edge image 60 (see FIG. 15). The edge image 60 is a two-dimensional image. Data about the edge image 60 is stored in the memory of the image processor 7.

Figure 15:
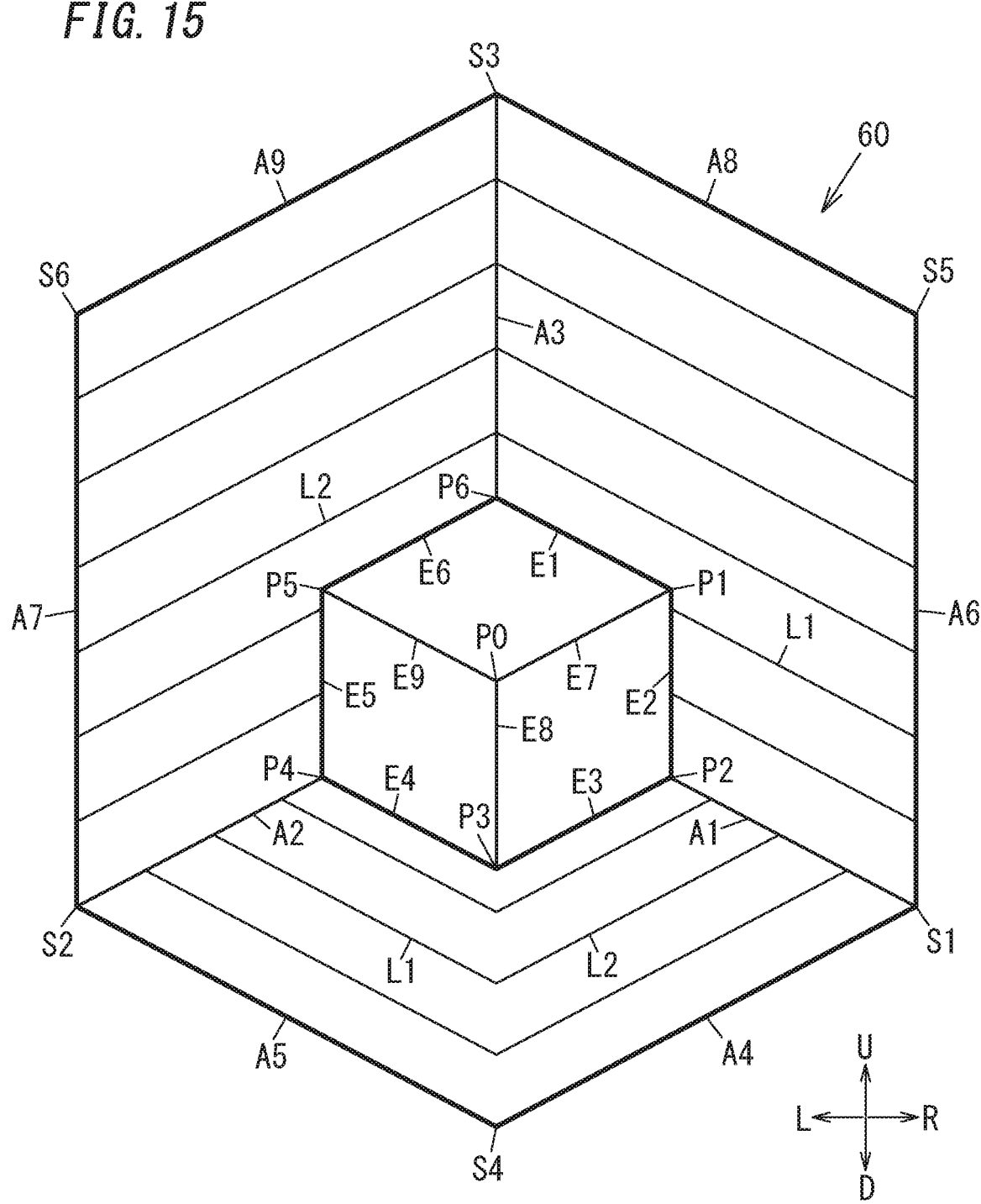
FIG. 15 illustrates an edge image generated based on an image captured by the imager.

The next Step S05 is detecting, from the edge image 60 shown in FIG. 15, edges and vertices of the measurement object 80 on the image. Now it will be described how to detect the edges and the vertices.

When the edge image 60 is described, a state where the measurement object 80 is viewed from the imager 6 that squarely faces the measurement object 80 will be regarded herein as a reference state. In such a state, the upside of the imager 6 herein defines an upward direction, the downside of the imager 6 a downward direction, the right side thereof a rightward direction, and the left side thereof a leftward direction.

Step S05 includes detecting a polygon surrounded with six edges (i.e., a hexagon) in the edge image 60. Step S05 further includes detecting a second hexagon in which respective edges, extending from three out of the six vertices thereof, intersect with each other at a point, in the former hexagon detected. The measurement object 80 on the edge image 60 is represented by those six edges that form the second hexagon and the three edges extending from the three vertices thereof.

Step S05 includes regarding those six edges that form the second hexagon as edges E1, E2, E3, E4, E5, and E6, respectively, which are named in this order clockwise by beginning with the upper right edge. Step S05 further includes regarding the intersection between the edges E1 and E2 as a vertex P1, the intersection between the edges E2 and E3 as a vertex P2, and the intersection between the edges E3 and E4 as a vertex P3. Also, Step S05 further includes regarding the intersection between the edges E4 and E5 as a vertex P4, the intersection between the edges E5 and E6 as a vertex P5, and the intersection between the edges E6 and E1 as a vertex P6.

Step S05 further includes regarding the intersection between the three edges E7, E8, and E9 extending from the vertices P1, P3, and P5, respectively, as a vertex P0.

The next Step S06 is detecting vertices and edges of the outer shell 2 from the edge image 60 shown in FIG. 15.

Specifically, Step S06 includes detecting, as an edge of the outer shell 2, an edge A1 extending diagonally downward to the right from the vertex P2. Step S06 also includes detecting, as another edge of the outer shell 2, an edge A2 extending diagonally downward to the left from the vertex P4. Step S06 further includes detecting, as still another edge of the outer shell 2, an edge A3 extending upward from the vertex P6.

Step S06 also includes regarding, as a vertex S1 of the outer shell 2, a vertex located at the other end, opposite from the vertex P2, of the edge A1. Step S06 further includes regarding, as another vertex S2 of the outer shell 2, a vertex located at the other end, opposite from the vertex P4, of the edge A2. Step S06 further includes regarding, as still another vertex S3 of the outer shell 2, a vertex located at the other end, opposite from the vertex P6, of the edge A3.

Step S06 further includes regarding, as a vertex S4 of the outer shell 2, an intersection between an edge A4 extending diagonally downward to the left from the vertex S1 and an edge A5 extending diagonally downward to the right from the vertex S2.

Step S06 further includes regarding, as yet another vertex S5 of the outer shell 2, a vertex located at the other end, opposite from the vertex S1, of the edge A6 extending upward from the vertex S1. Step S06 further includes regarding, as yet another vertex S6 of the outer shell 2, a vertex located at the other end, opposite from the vertex S2, of the edge A7 extending upward from the vertex S2.

Step S06 further includes detecting, as yet another edge A8 of the outer shell 2, an edge extending from the vertex S5 through the vertex S3. Step S06 further includes detecting, as yet another edge A9 of the outer shell 2, an edge extending from the vertex S6 through the vertex S3.

The next Step S07 is detecting the edges of the reference lines 4 from the edge image 60 shown in FIG. 15. Specifically, Step S07 includes detecting, as edges of the reference lines 4, edges L1 other than the edges E1-E9 and the edges A1-A9 and parallel to the edge A1. Step S07 further includes detecting, as other edges of the reference lines 4, edges L2 other than the edges E1-E9 and the edges A1-A9 and parallel to the edge A2.

The next Step S08 is determining the length dimension of the measurement object 80 in accordance with the results of detection based on the edge image 60 and the data shown in Table 1. Specifically, this Step S08 includes detecting that among the plurality of edges L1 located between the edges A1 and A5, the vertex P4 is located between the third edge L1 and the fourth edge L1 as counted from the vertex S2. Step S08 includes determining, in accordance with this detection result and the ordinal number data of the first lines 51 shown in Table 1, that the vertex P2 is located between the second edge L1 and the third edge L1 as counted from the reference corner point 30.

Step S08 further includes determining, by reference to Table 1, the length dimension of the measurement object 80 to be within the range from 10 cm to 15 cm.

The next Step S09 is determining the width dimension of the measurement object 80 in accordance with the results of detection based on the edge image 60 and the data shown in Table 2.

Specifically, this Step S09 includes detecting that among the plurality of edges L2 located between the edges A2 and A4, the vertex P2 is located between the third edge L2 and the fourth edge L2 as counted from the vertex S1. Step S09 includes determining, in accordance with this detection result and the ordinal number data of the second lines 52 shown in Table 2, that the vertex P2 is located between the second edge L2 and the third edge L2 as counted from the reference corner point 30.

Step S09 further includes determining, by reference to Table 2, the width dimension of the measurement object 80 to be within the range from 10 cm to 15 cm.

The next Step S10 is determining the height dimension of the measurement object 80 in accordance with the results of detection based on the edge image 60 and the data shown in Table 3.

Specifically, this Step S10 includes detecting that among the plurality of edges L1 located between the edges A1 and A8, the vertex P6 is located between the fourth edge L1 and the fifth edge L1 as counted from the vertex S3. Step S10 includes determining, in accordance with this detection result and the ordinal number data of the first lines 51 shown in Table 3, that the vertex P6 is located between the second edge L1 and the third edge L1 as counted from the reference corner point 30.

Step S10 further includes determining, by reference to Table 3, the height dimension of the measurement object 80 to be within the range from 10 cm to 15 cm.

Once the length, width, and height dimensions of the measurement object 80 are determined as described above, the procedure of the size measurement mode 71 ends by proceeding to Step S11.

According to the second embodiment described above, the interval between the plurality of first reference lines 41 is 5 cm, the interval between the plurality of second reference lines 42 is 5 cm, and the interval between the plurality of third reference lines 43 is 5 cm. Optionally, the dimension measurement device 1 may have its size measurement precision improved by narrowing these intervals.

The configuration of the dimension measurement device 1 according to the second embodiment described above is only a non-limiting exemplary aspect of the present invention. The dimension measurement device 1 may also be implemented in accordance with any of the following alternative aspects.

Figure 16A:
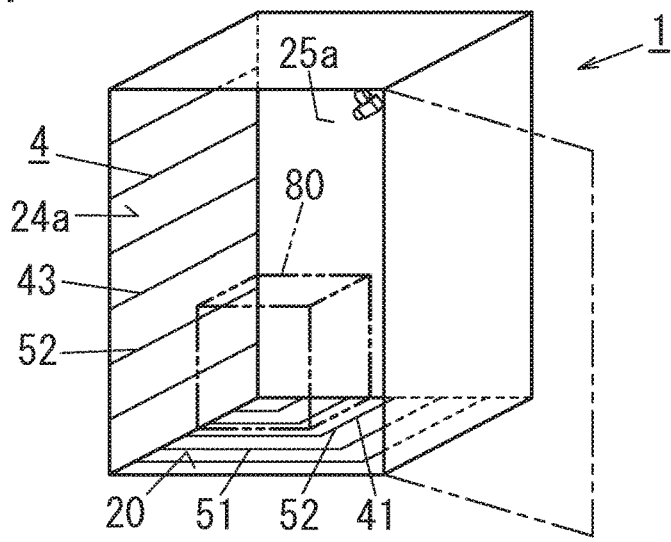
FIG. 16A is a perspective view illustrating still another example of the dimension measurement device.

As long as the dimension measurement device 1 is still able to determine the length, width, and height dimensions, one of the lower surface 20, first side surface 25a, or second side surface 24a thereof may have no reference lines 4 as shown in FIG. 16A.

The interval between the first lines 51 in the plurality of first reference lines 41 does not have to be 5 cm. The interval between the second lines 52 in the plurality of first reference lines 41 does not have to be 5 cm, either.

The interval between the plurality of second reference lines 42 themselves does not have to be 5 cm, either.

The interval between the plurality of third reference lines 43 themselves does not have to be 5 cm, either.

The intervals between the first lines 51 in the plurality of first reference lines 41 do not have to be regular, as long as their respective distances from the first concave corner 31 are measurable. The intervals between the second lines 52 in the plurality of first reference lines 41 do not have to be regular, as long as their respective distances from the second concave corner 32 are measurable.

The intervals between the plurality of second reference lines 42 themselves do not have to be regular, as long as their respective distances from the first concave corner 31 are measurable.

The intervals between the plurality of third reference lines 43 themselves do not have to be regular, as long as their respective distances from the second concave corner 32 are measurable.

Figure 16B:
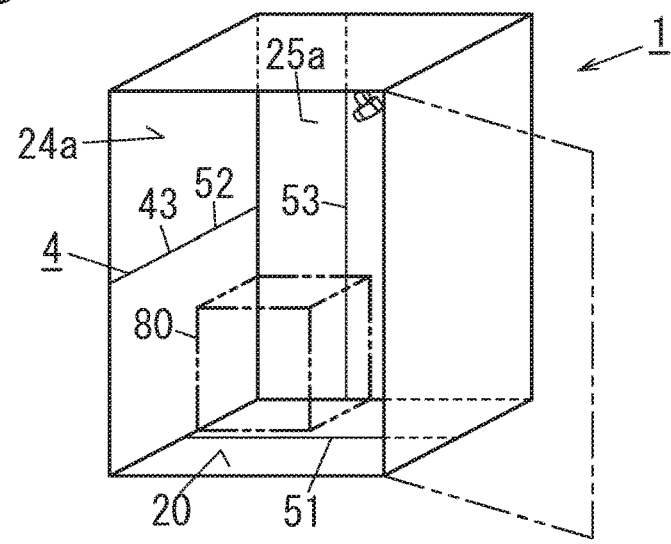
FIG. 16B is a perspective view illustrating yet another example of the dimension measurement device.

The dimension measurement device 1 may have only one first line 51 drawn on the lower surface 20, only one third line 53 drawn on the first side surface 25a, and only one second line 52 drawn on the second side surface 24a as shown in FIG. 16B, for example. In that case, when finding any of the length, width, or height dimension of the measurement object 80 to be equal to or greater than one of these reference lines 4, the dimension measurement device 1 determines the size of the measurement object 80 to be L. On the other hand, when finding all of the length, width, and height dimensions of the measurement object 80 to be less than the reference lines 4, the dimension measurement device 1 determines the size of the measurement object 80 to be S.

Figure 16C:
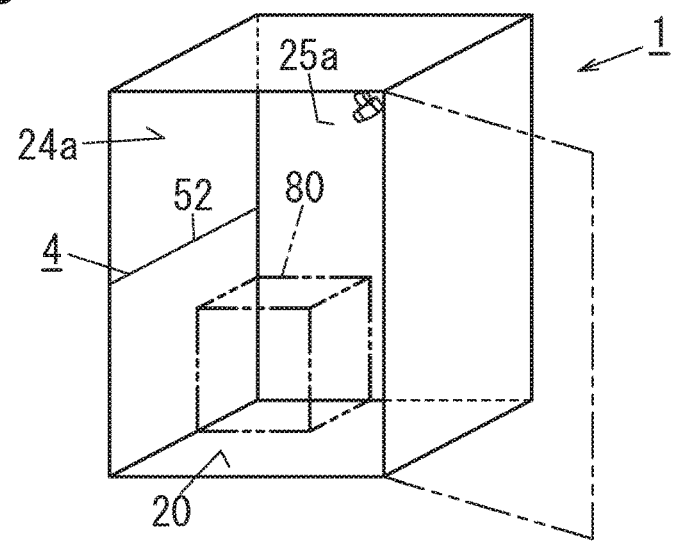
FIG. 16C is a perspective view illustrating yet another example of the dimension measurement device.

The dimension measurement device 1 may use at least one of the first line 51, the second line 52, or the third line 53. For example, the dimension measurement device 1 may have only one second line 52 drawn on the second side surface 24a as shown in FIG. 16C. In that case, the dimension measurement device 1 classifies the measurement object 80 according to its size by determining whether or not the height dimension of the measurement object 80 is equal to or greater than a predetermined dimension.

The reference lines 4 do not have to be solid lines but may also be any other type of lines such as dotted lines or chain lines. Among other things, a dotted line may be a line with a wide interval between its dots. For example, in a dotted line, the interval between the dots may be several times as large as the diameter of the dots.

The starting point of any of the first lines 51 extended may be located at some distance from either the second concave corner 32 or the third concave corner 33.

The starting point of any of the second lines 52 extended may be located at some distance from either the first concave corner 31 or the third concave corner 33.

The starting point of any of the third lines 53 extended may be located at some distance from either the first concave corner 31 or the second concave corner 32.

The measurement object 80 does not have to be a cubic or rectangular parallelepiped one, but three surfaces thereof to be imaged by the imager 6 just need to have a rectangular shape.

The outer shell 2 is herein supposed to be a rectangular parallelepiped one. However, this is only an example and should not be construed as limiting. The outer shell 2 may also have a cubic shape, for example.

The inner space 10 is herein supposed to be a rectangular parallelepiped one. However, this is only an example and should not be construed as limiting. The inner space 10 may also have a cubic shape, for example.

The reference corner point 30 may be any one of the four corners formed by the lower surface 20, the right surface 23a, the left surface 24b, the rear surface 25b, and the front surface 27a.

In the dimension measurement device 1, the first side 20a does not have to be the rear side of the lower surface 20, the second side 20b does not have to be the left side of the lower surface 20, the first side surface 25a does not have to be the rear surface 25b, and the second side surface 24a does not have to be the left surface 24b.

For example, if the dimension measurement device 1 has the reference corner point 30 at a deep right corner, then the rear side of the lower surface 20 defines the first side 20a, and the right side of the lower surface 20 defines the second side 20b. In such a dimension measurement device 1, the rear surface 25b defines the first side surface 25a and the right surface 23a defines the second side surface 24a.

The imager 6 needs to be arranged at such a position as to readily capture an image of at least the reference lines 4, the vertices P0-P6 and edges E1-E9 of the measurement object 80, the edges A1-A7 of the storage receptacle 11, and the vertices S1, S2, and S4 of the storage receptacle 11.

The camera body 61 may also be a complementary metal oxide semiconductor (CMOS) camera.

The image captured by the imager 6 may be a grayscale image or a color image. If the image captured by the imager 6 is a color image, the color image is suitably converted into a grayscale image during the image processing.

In the imager 6, the light fixture 62 is connected to the controller for the camera body 61 so as to be turned ON and OFF by the controller for the camera body 61. Alternatively, the light fixture 62 may be connected to, and controlled by, the image processor 7.

Optionally, in the imager 6, the controller for the camera body 61 and the light fixture 62 may be connected together wirelessly.

Also, in the imager 6, the camera body 61 and the light fixture 62 may be provided separately from each other.

The light fixture 62 may also be a fluorescent lamp, a light bulb, or an LED in any other appropriate color. The light fixture 62 suitably has such color and brightness that would allow the image processor 7 to easily detect edges in the image captured by the camera body 61.

The CPU of the image processor 7 may be any appropriate one of various known microcomputers.

The size measurement mode 71 does not have to be carried out following the procedure of processing of the flowchart shown in FIG. 14. According to an alternative size measurement mode 71, a size of the measurement object 80 may be measured by detecting a vertex or an edge of the measurement object 80 or an edge of any of the reference lines 4 with a vertex P0 specified by a marker, for example, on the edge image 60.

Optionally, the processing of the size measurement mode 71 may include detecting only edges from the image captured by the imager 6 without detecting any vertices. In that case, the size may be determined, for example, by detecting the ordinal numbers of the edges L1, between which the edge E1 is located.

The size measurement mode 71 may include reducing, using an average filter or a median filter, noise from the image captured by the imager 6.

The filter processing of the size measurement mode 71 uses a Sobel filter or a Prewitt filter as a first-order differential operator, for example. Alternatively, a second-order differential operator may also be used for the filter processing.

Furthermore, in the size measurement mode 71, the image subjected to the filter processing may be binarized by the moving average method or by a method using two threshold values, for example.

The hexagon detected in the size measurement mode 71 may be a regular hexagon or may be a deformed hexagon as well.

The dimension measurement device 1 with the configuration described above draws, as reference line(s) 4, the first line 51, the second line 52, and/or the third line 53 in the storage receptacle 11, and measures a size of the measurement object 80 by reference to those lines. This allows the dimension measurement device 1 to curb a decline in measurement accuracy of the size of the measurement object 80, even when the image captured by the imager 6 is distorted. Particularly, using a wide-angle camera as the camera body 61 of the imager 6 in the dimension measurement device 1 certainly allows an image of the inner space 10 to be captured by the imager 6 in a wide range but often makes the captured image distorted. Thus, drawing such reference lines 4 is highly beneficial in curbing the decline in measurement accuracy. In addition, loading a measurement object 80 with a great size into the device shortens the distance from the camera body 61 to the measurement object 80, thus making the captured image significantly distorted. In such a situation, drawing such reference lines 4 is highly beneficial in curbing the decline in measurement accuracy.

In addition, measuring the length, width, and height dimensions of the measurement object 80 by reference to the plurality of first lines 51 and the plurality of second lines 52 also allows the dimension measurement device 1 to more precisely determine the size of the measurement object 80. Optionally, providing at least one of the first line 51, the second line 52, or the third line 53 for the storage receptacle 11 also allows the dimension measurement device 1 to determine any particular one of the length, width, or height dimension of the measurement object 80.

Conventional dimension measurement devices 1 need to determine the coordinates of vertices of the measurement object 80 in an image, estimate, based on those coordinates, the length, width, and height dimensions of the measurement object 80 in the image, and then convert those estimated dimensions into dimensions in the real space of the measurement object 80. On the other hand, the dimension measurement device 1 according to the second embodiment is able to measure the size of the measurement object 80 by the positional relationship between the vertex P2 and the edge(s) L2 on the edge image 60, the positional relationship between the vertex P4 and the edge(s) L1 on the edge image 60, and the positional relationship between the vertex P6 and the edge(s) L1 on the edge image 60.

This allows the dimension measurement device 1 according to the second embodiment to measure the size of the measurement object 80 more easily than the conventional dimension measurement devices 1.

As can be seen from the foregoing description, the dimension measurement device 1 according to the second embodiment has the following configuration.

The dimension measurement device 1 according to the second embodiment has the following first feature. According to the first feature, the dimension measurement device 1 has the following first feature. The dimension measurement device 1 with the first feature includes: a storage receptacle 11 configured to store a measurement object 80 so as to allow the measurement object 80 to be readily loaded into, and unloaded from, the storage receptacle 11; and an imager 6 provided for the storage receptacle 11 to capture an image of the measurement object 80 to be stored in the storage receptacle 11. The dimension measurement device 1 further includes an image processor 7 configured to perform image processing based on information about the image captured by the imager 6 to measure a size of the measurement object 80.

The storage receptacle 11 includes: a rectangular lower surface 20 configured to put the measurement object 80 thereon; a rectangular first side surface 25a extended upward from the lower surface 20; and a rectangular second side surface 24a also extended upward from the lower surface 20 and adjacent to the first side surface 25a. The storage receptacle 11 further includes: a first concave corner 31 formed by the lower surface 20 and the first side surface 25a; a second concave corner 32 formed by the lower surface 20 and the second side surface 24a; and a third concave corner 33 formed by the first side surface 25a and the second side surface 24a. The storage receptacle 11 further includes a reference corner point 30 formed at an intersection between the first concave corner 31, the second concave corner 32, and the third concave corner 33 and defining a reference point for placing the measurement object 80 at a predetermined location. The storage receptacle 11 further includes markers (reference lines 4) indicating locations of respective sides of the first side surface 25a, the second side surface 24a, and the lower surface 20.

The markers (reference lines 4) each include at least one of: a first line 51 parallel to length of the first concave corner 31 and provided for either or each of the lower surface 20 and the first side surface 25a; a second line 52 parallel to length of the second concave corner 32 and provided for either or each of the lower surface 20 and the second side surface 24a; or a third line 53 parallel to length of the third concave corner 33 and provided for either or each of the first side surface 25a and the second side surface 24a.

The dimension measurement device 1 with this first feature measures the size of the measurement object 80 with respect to the reference line(s) 4 provided for the storage receptacle 11, thus curbing a decline in the size measurement accuracy of the measurement object 80 even when an image captured by the imager 6 is distorted. In addition, using the markers (reference lines 4) also allows the dimension measurement device 1 with the first feature to more easily recognize the respective sides of the first side surface 25a, the second side surface 24a, and the lower surface 20.

The dimension measurement device 1 with the first feature according to the second embodiment has the following second additional feature. According to the second feature, the reference lines 4 include at least two of the first line 51, the second line 52, and the third line 53.

The dimension measurement device 1 with this second feature is able to measure the size of the measurement object 80 based on length, width, and height dimensions of the measurement object 80, and therefore, is able to more precisely classify the measurement object 80 according to its size.

The dimension measurement device 1 with the first and second features according to the second embodiment has the following third additional feature. According to the third feature, the imager 6 includes a light fixture 62 configured to light up the storage receptacle 11.

The dimension measurement device 1 with this third feature is able to overcome a lack of light inside the storage receptacle 11 by illuminating the inside of the storage receptacle 11 with light emitted from the light fixture 62.

Application Examples of Second Embodiment

Some application examples of the second embodiment described above will be described with reference to FIGS. 17A, 17B, 18A, 18B, 19A, 19B, 20A, and 20B. The application examples of the second embodiment are mostly the same as the second embodiment described above. Thus, any constituent member of these application examples having the same function as the counterpart of the second embodiment described above will be designated by the same reference numeral as that counterpart's, and a detailed description thereof will be omitted herein. Instead, the following description will be focused on only differences of the application examples from the second embodiment.

In the dimension measurement device 1 according to each of these application examples of the second embodiment, a pattern is formed by the first lines 51, the second lines 52, and/or the third line 53 in at least one of the lower surface 20, the first side surface 25a, or the second side surface 24a.

Figure 17A:
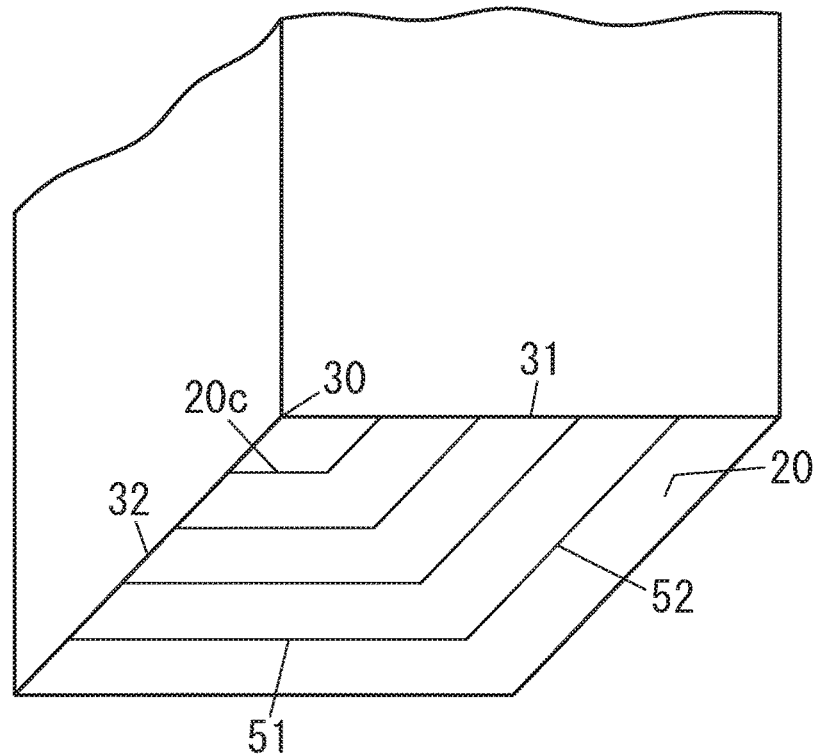
FIG. 17A is a perspective view illustrating an application example of the dimension measurement device.
Figure 17B:
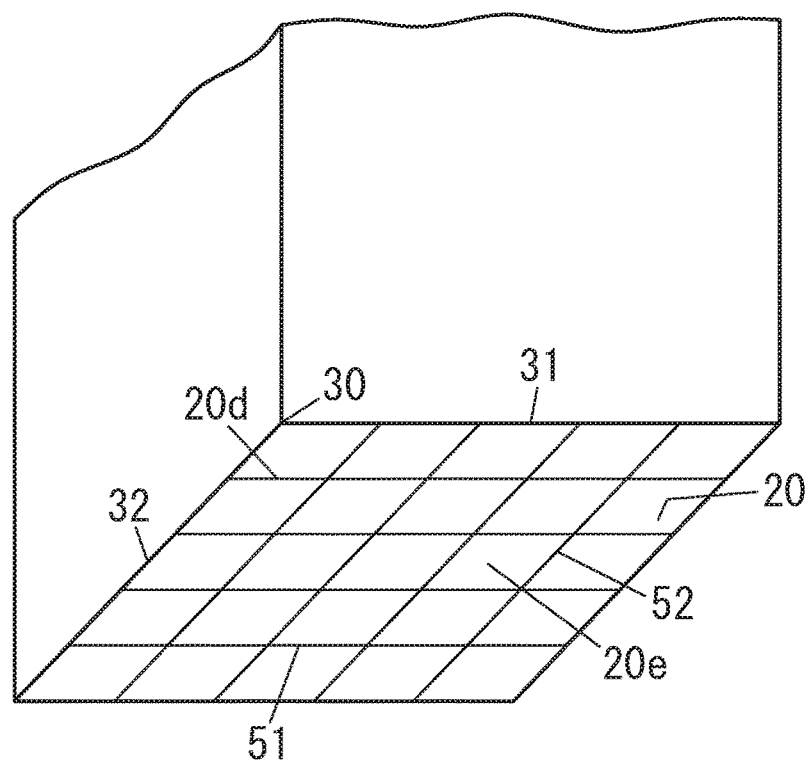
FIG. 17B is a perspective view illustrating another application example of the dimension measurement device.

In the dimension measurement device 1, a pattern is formed by the first lines 51 and the second lines 52 on the lower surface 20 as shown in FIGS. 17A and 17B. In the following description of the dimension measurement device 1, the pattern formed on the lower surface 20 as shown in FIG. 17A will be hereinafter referred to as a "first pattern" 20c, and the pattern formed on the lower surface 20 as shown in FIG. 17B will be hereinafter referred to as a "second pattern" 20d.

The first pattern 20c is the same as the first reference lines 41 that have already been described for the second embodiment as shown in FIG. 17A. That is to say, the first pattern 20c is a combination of the first lines 51 and the second lines 52. Each of the first reference lines 41 is made up of the first line 51 extended rightward from the second concave corner 32 and the second line 52 extended from the end of the extended first line 51 through the first concave corner 31. The first pattern 20c is formed by arranging a plurality of first reference lines 41 from the reference corner point 30 diagonally forward to the right.

In the first pattern 20c, a plurality of first lines 51 of the first reference lines 41 are arranged forward from the reference corner point 30 such that the closer to the front end a first line 51 is, the longer the first line 51 is. Also, in the first pattern 20c, a plurality of second lines 52 of the first reference lines 41 are arranged rightward from the reference corner point 30 such that the closer to the right end a second line 52 is, the longer the second line 52 is.

Figure 18A:
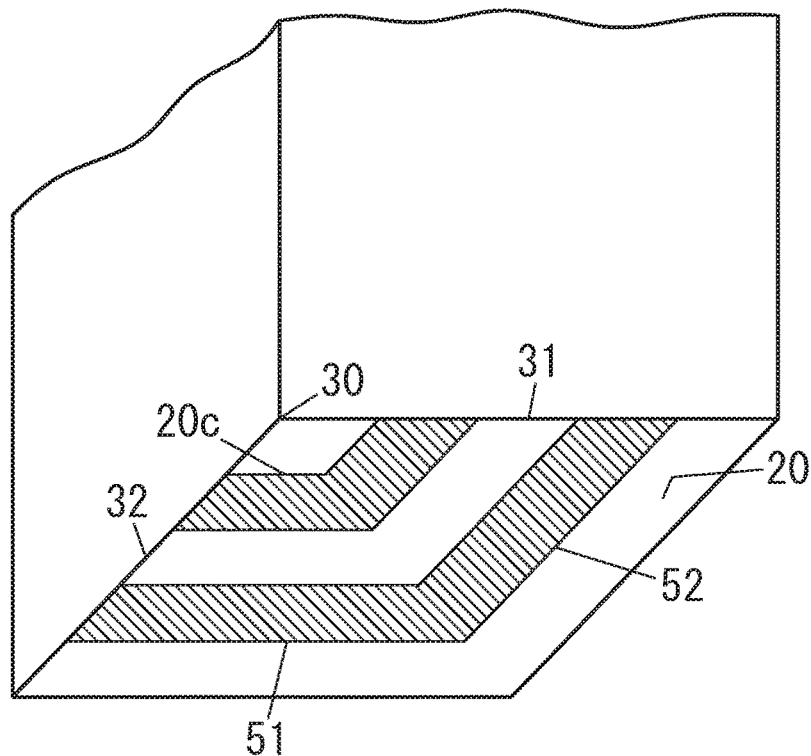
FIG. 18A is a perspective view illustrating still another application example of the dimension measurement device.

Forming such a first pattern 20c on the lower surface 20 produces a visual effect of allowing the user to more easily locate the reference corner point 30 in the dimension measurement device 1. In particular, coloring the space between pairs of first reference lines 41 as shown in FIG. 18A enhances such a visual effect for the user. In the first pattern 20c of this example, every other space between the first reference lines 41 is suitably colored from the reference corner point 30. Also, the color suitably has a significantly different luminance value from that of the first lines 51 and the second lines 52.

As shown in FIG. 17B, the second pattern 20d is different from the first pattern 20c that is a combination of the first lines 51 and the second lines 52.

In the second pattern 20d, a plurality of first lines 51 are arranged forward from the reference corner point 30 such that each of the first lines 51 extends from the second concave corner 32 through the opposite concave corner. Also, in the second pattern 20d, a plurality of second lines 52 are arranged rightward from the reference corner point 30 such that each of the second lines 52 extends from the first concave corner 31 through the opposite concave corner.

The second pattern 20d is a checkerboard pattern (or grid pattern) formed of the plurality of first lines 51 and the plurality of second lines 52 as shown in FIG. 17B. In the second pattern 20d of this example, a plurality of grid elements 20e are arranged both laterally and longitudinally.

Figure 18B:
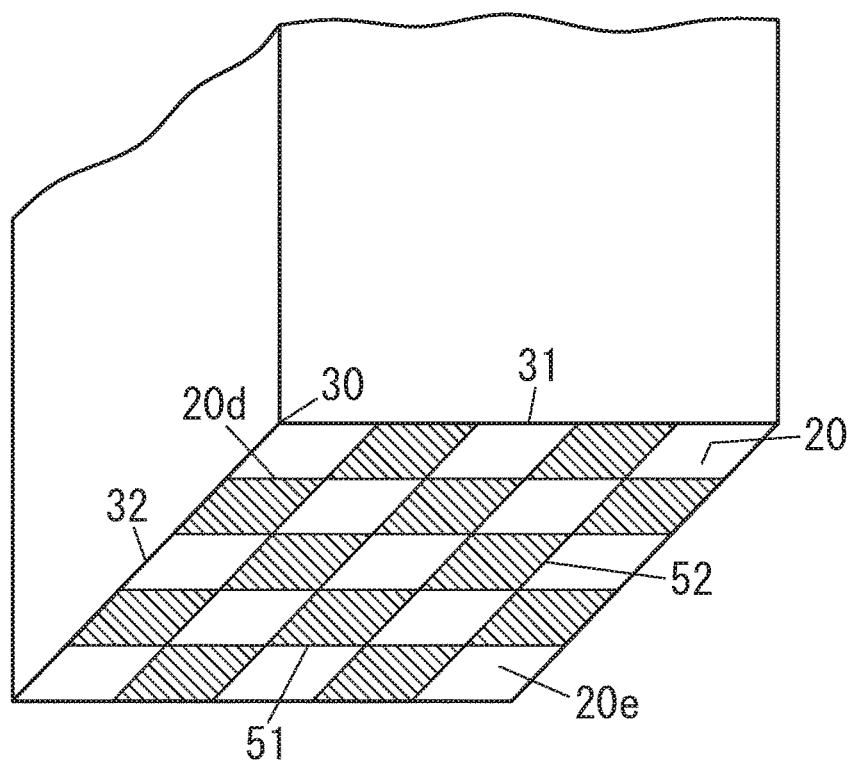
FIG. 18B is a perspective view illustrating yet another application example of the dimension measurement device.

Forming the second pattern 20d as such a grid pattern on the lower surface 20 makes the second pattern 20d serve as grid lines, thus allowing the user to more easily notice that he or she has put the measurement object 80 obliquely. This produces a visual effect for the user, prompting him or her to properly position the measurement object 80 with respect to the reference corner point 30 of the dimension measurement device 1. In particular, coloring the plurality of grid elements 20e as shown in FIG. 18B increases the accuracy of detecting the first lines 51 and the second lines 52. In the second pattern 20d of this example, among the plurality of grid elements 20e arranged longitudinally, every other grid element 20e is suitably colored from the first concave corner 31 forward. Also, in the second pattern 20d of this example, among the plurality of grid elements 20e arranged laterally, every other grid element 20e is suitably colored from the second concave corner 32 rightward. Furthermore, the color suitably has a significantly different luminance value from that of the first lines 51 and the second lines 52.

Figure 19A:
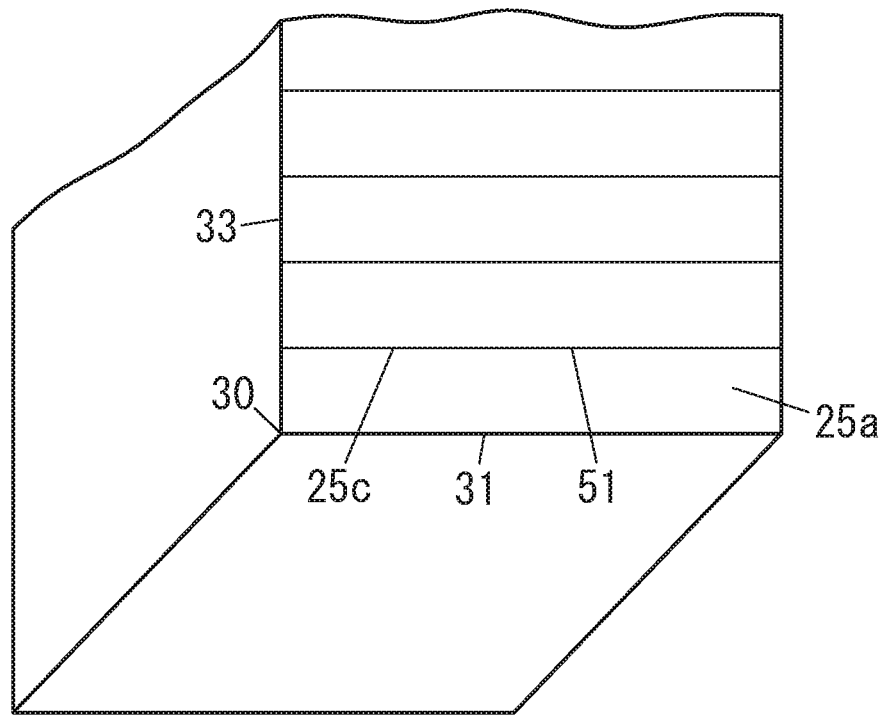
FIG. 19A is a perspective view illustrating yet another application example of the dimension measurement device.
Figure 19B:
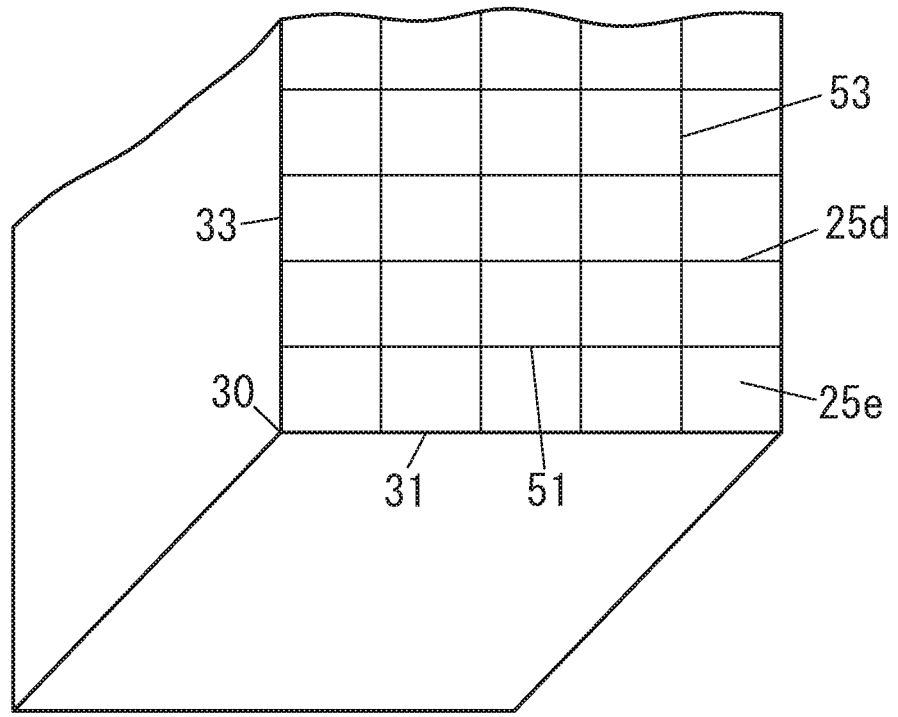
FIG. 19B is a perspective view illustrating yet another application example of the dimension measurement device.

In the dimension measurement device 1, a pattern is formed on the first side surface 25a by the first lines 51 with or without the third lines 53 as shown in FIGS. 19A and 19B. In this example of the dimension measurement device 1, the pattern formed on the first side surface 25a as shown in FIG. 19A will be hereinafter referred to as a "third pattern" 25c, and the pattern formed on the first side surface 25a as shown in FIG. 19B will be hereinafter referred to as a "fourth pattern" 25d.

The third pattern 25c is formed by the first lines 51 as shown in FIG. 19A.

In the third pattern 25c, a plurality of first lines 51 are arranged upward from the reference corner point 30, and each of the first lines 51 extends from the third concave corner 33 through the opposite concave corner.

Figure 20A:
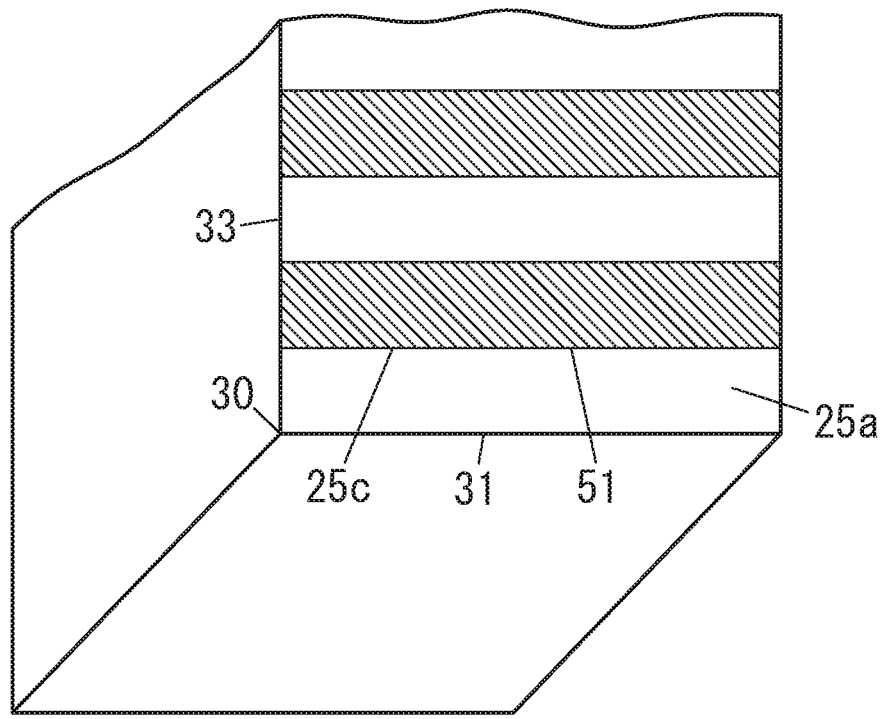
FIG. 20A is a perspective view illustrating yet another application example of the dimension measurement device.

In such a third pattern 25c, coloring the space between a plurality of first lines 51 as shown in FIG. 20A may increase the accuracy of detecting the first lines 51. In the third pattern 25c of this example, every other space between the first lines 51 vertically arranged is suitably colored from the first concave corner 31 upward. Also, the color suitably has a significantly different luminance value from that of the first lines 51.

The fourth pattern 25d is a combination of the first lines 51 and the third lines 53 as shown in FIG. 19B, and is a checkerboard pattern (or grid pattern) similar to the second pattern 20d.

In the fourth pattern 25d, a plurality of first lines 51 are arranged upward from the reference corner point 30 such that each of the first lines 51 extends from the third concave corner 33 through the opposite concave corner. Also, in the fourth pattern 25d, a plurality of third lines 53 are arranged rightward from the reference corner point 30 such that each of the third lines 53 extends from the first concave corner 31 through the opposite concave corner.

The fourth pattern 2d is a checkerboard pattern (or grid pattern) formed of the plurality of first lines 51 and the plurality of third lines 53 as shown in FIG. 19B. In the fourth pattern 2d of this example, a plurality of grid elements 25e are arranged both laterally and vertically.

Figure 20B:
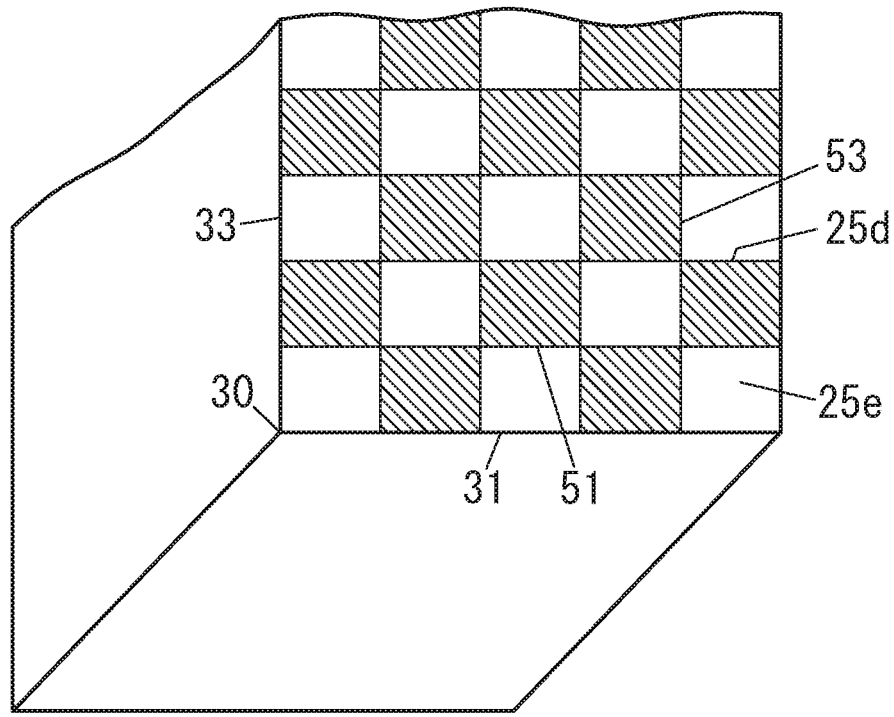
FIG. 20B is a perspective view illustrating yet another application example of the dimension measurement device.

In the fourth pattern 25d with such a grid pattern, coloring the plurality of grid elements 25e as shown in FIG. 20B increases the accuracy of detecting the first lines 51 and the third lines 53. In the fourth pattern 25d of this example, among the plurality of grid elements 25e arranged laterally, every other grid element 25e is suitably colored from the third concave corner 33 rightward. Also, in the fourth pattern 25d of this example, among the plurality of grid elements 25e arranged vertically, every other grid element 25e is suitably colored from the first concave corner 31 upward. Furthermore, the color suitably has a significantly different luminance value from that of the first lines 51 and the third lines 53.

The configuration of the dimension measurement device 1 according to the application examples of the second embodiment described above is only a non-limiting exemplary aspect of the present invention. The dimension measurement device 1 may also be implemented in accordance with any of the following alternative aspects.

Optionally, the dimension measurement device 1 may have the first pattern 20c and the third pattern 25c or the fourth pattern 25d in combination.

Alternatively, the dimension measurement device 1 may have the second pattern 20d and the third pattern 25c or the fourth pattern 25d in combination.

The first pattern 20c, the second pattern 20d, the third pattern 25c, and the fourth pattern 25d may have their colored spaces or elements reversed.

In the dimension measurement device 1, the sidewall 22 with the third pattern 25c or the fourth pattern 25d is suitably the first side surface 25a facing the receptacle opening 12. Alternatively, the pattern may be formed on the second side surface 24a instead of the first side surface 25a.

Also, in the dimension measurement device 1, the third pattern 25c and the fourth pattern 25d may be formed on the first side surface 25a and the second side surface 24a, respectively, or vice versa.

<Parcel Locker System>

A parcel locker system including the dimension measurement device according to the second embodiment will be described with reference to FIGS. 21A and 21B. In the following description, any constituent member of the parcel locker system having the same function as the counterpart of the second embodiment or application examples thereof described above will be designated by the same reference numeral as that counterpart's, and description thereof will be omitted herein. Instead, the following description will be focused on only differences of the parcel locker system from the second embodiment or application examples thereof.

This parcel locker system 9 may be installed in any of various different types of public places open to the general public, and may be used to allow an unspecified number of people to drop off their parcels to be shipped from this system.

Figure 21A:
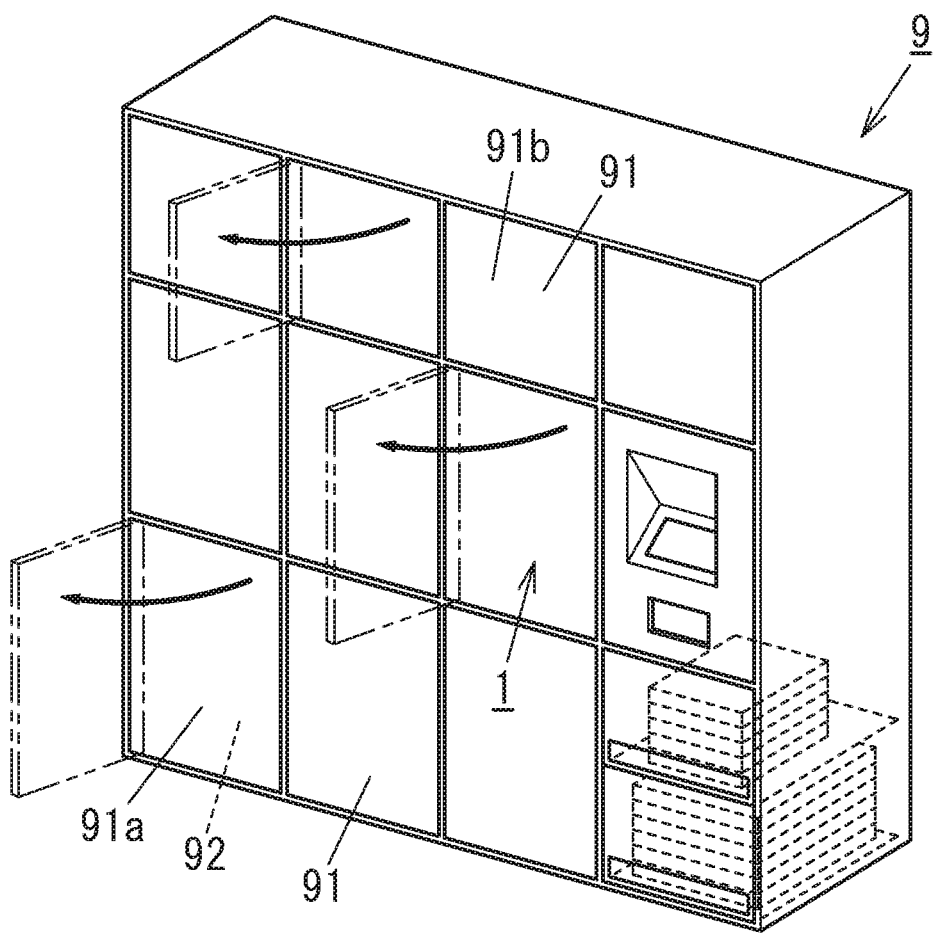
FIG. 21A is a perspective view illustrating a parcel locker system including the dimension measurement device.
Figure 21B:
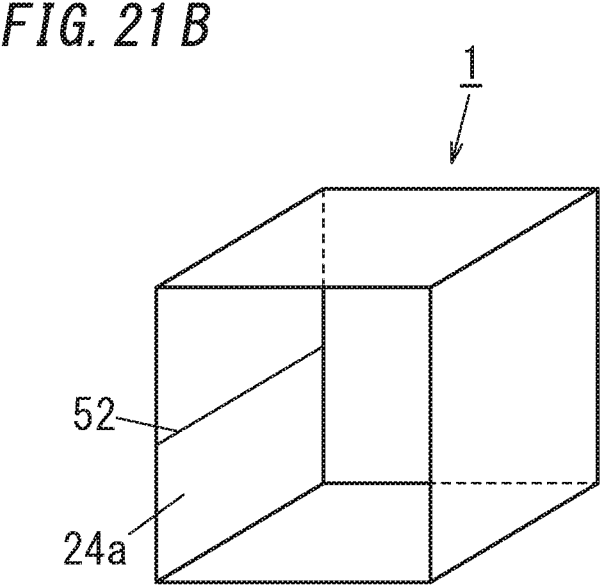
FIG. 21B is a perspective view illustrating a dimension measurement device for use in the parcel locker system.

This parcel locker system 9 includes the dimension measurement device 1 described above and multiple types of parcel storage boxes 91 of different sizes as shown in FIG. 21A. The parcel locker system 9 is configured to classify a given parcel, which is a measurement object 80 that has had its size measured by the dimension measurement device 1, according to its size and store the parcel in a best one of the multiple types of parcel storage boxes 91 of different sizes.

The parcel locker system 9 includes two types of parcel storage boxes 91 of two different sizes, which have the same shape and dimensions when viewed from over the storage space 92 but which have different height dimensions when viewed from the front of the storage space 92. The parcel storage boxes 91 of two different types include first parcel storage boxes 91a with a relatively large height dimension and second parcel storage boxes 91b with a smaller height dimension than the first parcel storage boxes 91a.

The parcel locker system 9 makes the dimension measurement device 1 measure the length, width, and height dimensions of a given parcel and chooses the best one 91 of the first and second parcel storage boxes 91a, 91b of two different sizes. On choosing the best parcel storage box 91, the parcel locker system 9 lets its door open automatically, thus notifying the user of its location. In this manner, the parcel locker system 9 allows the user to drop off his or her parcel in a parcel storage box 91 of the better size for the parcel.

The configuration of the parcel locker system 9 described above is only a non-limiting exemplary aspect of the present invention. The parcel locker system 9 may also be implemented in accordance with any of the following alternative aspects.

The parcel locker system 9 may be installed and used in a private place (i.e., a non-public place) available to only a limited number of specified persons.

The first parcel storage boxes 91a and the second parcel storage boxes 91b have storage spaces 92 with the same depth, the same width, but mutually different heights. That is why the dimension measurement device 1 may have only one second line 52 drawn on the second side surface 24a as shown in FIG. 21B. In that case, a second parcel storage box 91b is chosen for any parcel having a height short of the second line 52 on the second side surface 24a. On the other hand, a first parcel storage box 91a is chosen for any parcel which is either as high as, or higher than, the second line 52 on the second side surface 24a.

Multiple types of parcel storage boxes 91 do not have to include only the first parcel storage boxes 91a and the second parcel storage boxes 91b, but may include three or more types of parcel storage boxes 91 with mutually different heights. Optionally, the multiple types of parcel storage boxes 91 may include multiple types of parcel storage boxes 91, at least two of the depths, widths, and heights of which are different from each other. In that case, the parcel locker system 9 makes the dimension measurement device 1 measure the length, width, and height dimensions of a given parcel, and chooses a best one of the multiple types of parcel storage boxes 91 for the given parcel.

Drawing a reference line 4 in the storage receptacle 11 and determining the size of the given parcel by reference to the reference line 4 allows the parcel locker system 9 with the configuration described above to choose an appropriate parcel storage box 91 for the size of the given parcel. This allows the parcel locker system 9 to curb a decline in the accuracy of size measurement of the given parcel, even when the image captured by the imager 6 is distorted, and increase the chances of choosing an appropriate parcel storage box 91 for the size of the given parcel.

In addition, this parcel locker system 9 is able to measure a size of a given parcel based on the positional relationship between vertices of the parcel and the reference line. This allows the parcel locker system 9 to measure the size of the parcel more easily than conventional parcel locker systems 9.

The parcel locker system 9 including the dimension measurement device 1 with the first to third features of the second embodiment described above has the following fourth additional feature. According to the fourth feature, the parcel locker system 9 includes multiple different types of parcel storage boxes 91 configured to store a given parcel, which has had its size measured by the dimension measurement device 1, by classifying the parcel according to its size.

The parcel locker system 9 with this fourth feature is able to curb a decline in the accuracy of size measurement of the given parcel, even when the image captured by the imager 6 is distorted, and is more likely to choose an appropriate parcel storage box 91 for the size of the given parcel.

REFERENCE SIGNS LIST

1 Dimension Measurement Device
101 Dimension Measurement Device
103 Imager
104 Image Processor
11 Storage Receptacle
111 Storage Receptacle
112 First Concave Corner
113 Second Concave Corner
114 Third Concave Corner
115 Reference Corner Point
116 Marker
1201 Lower Surface
1232 Second Side Surface
1242 First Side Surface
1251 Upper Surface
1261 Receptacle Opening
132 Light Fixture
142 Binary Image
144 Corrected Image
150 Measurement Object
20 Lower Surface
211 Lower Surface
211a First Side
211b Second Side
24a Second Side Surface
240 Second Side Surface
25a First Side Surface
250 First Side Surface
30 Reference Corner Point
31 First Concave Corner
32 Second Concave Corner
33 Third Concave Corner
4 Reference Line
51 First Line
52 Second Line
53 Third Line
6 Imager
62 Light Fixture
7 Image Processor 80 Measurement Object
9 Parcel Locker System
91 Parcel Storage Box
A11 Edge
T1 Edge

The invention claimed is:

1. A dimension measurement device comprising:
a storage receptacle configured to store a measurement object so as to allow the measurement object to be readily loaded into, and unloaded from, the storage receptacle;
an imager provided for the storage receptacle to capture an image of the measurement object to be stored in the storage receptacle; and
an image processor configured to perform image processing based on information about the image captured by the imager to measure a size of the measurement object,
the storage receptacle including:
a rectangular lower surface configured to put the measurement object thereon;
a rectangular first side surface extended upward from the lower surface;
a rectangular second side surface also extended upward from the lower surface and adjacent to the first side surface;
a first concave corner formed by the lower surface and the first side surface;
a second concave corner formed by the lower surface and the second side surface;
a third concave corner formed by the first side surface and the second side surface;
a reference corner point formed at an intersection between the first concave corner, the second concave corner, and the third concave corner and defining a reference point for placing the measurement object at a predetermined location; and
markers indicating locations of respective sides of the first side surface, the second side surface, and the lower surface,
wherein the storage receptacle further includes:
a rectangular upper surface extended from respective upper ends of the first side surface and the second side surface; and
a receptacle opening facing the first side surface and allowing the measurement object to be loaded into, and unloaded from, the storage receptacle,
wherein the imager is arranged at an end of the upper surface, the end being located adjacent to a side of the receptacle opening and opposite from the reference corner point.

2. A dimension measurement device comprising:
a storage receptacle configured to store a measurement object so as to allow the measurement object to be readily loaded into, and unloaded from, the storage receptacle;
an imager provided for the storage receptacle to capture an image of the measurement object to be stored in the storage receptacle; and
an image processor configured to perform image processing based on information about the image captured by the imager to measure a size of the measurement object,
the storage receptacle including:
a rectangular lower surface configured to put the measurement object thereon;
a rectangular first side surface extended upward from the lower surface;
a rectangular second side surface also extended upward from the lower surface and adjacent to the first side surface;
a first concave corner formed by the lower surface and the first side surface;
a second concave corner formed by the lower surface and the second side surface;
a third concave corner formed by the first side surface and the second side surface;
a reference corner point formed at an intersection between the first concave corner, the second concave corner, and the third concave corner and defining a reference point for placing the measurement object at a predetermined location; and
markers indicating locations of respective sides of the first side surface, the second side surface, and the lower surface,
wherein the markers each include at least one of:
a first line parallel to length of the first concave corner and provided for either or each of the lower surface and the first side surface;
a second line parallel to length of the second concave corner and provided for either or each of the lower surface and the second side surface; or
a third line parallel to length of the third concave corner and provided for either or each of the first side surface and the second side surface.

3. The dimension measurement device of claim 2, wherein
the reference lines comprise at least two of the first line, the second line, and the third line.

4. A parcel locker system comprising a dimension measurement device, and multiple different types of parcel storage boxes,
the dimension measurement device comprising:
a storage receptacle configured to store a measurement object so as to allow the measurement object to be readily loaded into, and unloaded from, the storage receptacle;
an imager provided for the storage receptacle to capture an image of the measurement object to be stored in the storage receptacle; and
an image processor configured to perform image processing based on information about the image captured by the imager to measure a size of the measurement object,
the storage receptacle including:
a rectangular lower surface configured to put the measurement object thereon;
a rectangular first side surface extended upward from the lower surface;
a rectangular second side surface also extended upward from the lower surface and adjacent to the first side surface;
a first concave corner formed by the lower surface and the first side surface;
a second concave corner formed by the lower surface and the second side surface;
a third concave corner formed by the first side surface and the second side surface;
a reference corner point formed at an intersection between the first concave corner, the second concave corner, and the third concave corner and defining a reference point for placing the measurement object at a predetermined location; and markers indicating locations of respective sides of the first side surface, the second side surface, and the lower surface, the multiple different types of parcel storage boxes being configured to store a given parcel, which is a measurement object that has had its size measured by the dimension measurement device, by classifying the parcel according to its size.

5. A dimension measurement method executed by a dimension measurement device, the dimension measurement device comprising:

a storage receptacle configured to store a measurement object so as to allow the measurement object to be readily loaded into, and unloaded from, the storage receptacle, the storage receptacle including a rectangular lower surface configured to put the measurement object thereon, a rectangular first side surface extended upward from the lower surface, a rectangular second side surface also extended upward from the lower surface and adjacent to the first side surface, a first concave corner formed by the lower surface and the first side surface, a second concave corner formed by the lower surface and the second side surface, a third concave corner formed by the first side surface and the second side surface, a reference corner point formed at an intersection between the first concave corner, the second concave corner, and the third concave corner and defining a reference point for placing the measurement object at a predetermined location, and markers indicating locations of respective sides of the first side surface, the second side surface, and the lower surface;

an imager provided for the storage receptacle to capture an image of the measurement object to be stored in the storage receptacle; and an image processor configured to perform image processing based on information about the image captured by the imager to measure a size of the measurement object, the image processor measuring the size of the measurement object by performing:

binarizing, before the measurement object is loaded into the storage receptacle, the image captured by the imager to generate a binary image;

recognizing the markers in the binary image;

distinguishing, by reference to the markers, respective edges corresponding to respective sides of the first side surface, the second side surface, and the lower surface in the binary image;

generating, based on distortion of the respective edges, distortion correction data;

binarizing, after the measurement object has been loaded into the storage receptacle, the image captured by the imager to generate a binary image;

performing, in accordance with the distortion correction data, correction to edge distortion, detected in the binary image, of the measurement object to acquire a corrected image; and scanning planes, representing the first side surface, the second side surface, and the lower surface, of the corrected image.

6. The method of claim 5, wherein the storage receptacle further includes:

a rectangular upper surface extended from respective upper ends of the first side surface and the second side surface; and a receptacle opening facing the first side surface and allowing the measurement object to be loaded into, and unloaded from, the storage receptacle, wherein the imager is arranged at an end of the upper surface, the end being located adjacent to a side of the receptacle opening and opposite from the reference corner point.

* * * * *